(12) United States Patent
Smith et al.

(10) Patent No.: US 10,207,756 B2
(45) Date of Patent: *Feb. 19, 2019

(54) MOUNTING STRUCTURE WITH STORABLE TRANSPORT SYSTEM

(71) Applicant: Entro Industries, Inc., Hillsboro, OR (US)

(72) Inventors: Shawn R. Smith, Hillsboro, OR (US); Harlan B. Smith, Beaverton, OR (US)

(73) Assignee: ENTRO INDUSTRIES, INC., Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,927

(22) Filed: May 4, 2018

(65) Prior Publication Data

US 2018/0290700 A1  Oct. 11, 2018

Related U.S. Application Data

(63) Continuation of application No. 15/828,073, filed on Nov. 30, 2017, now Pat. No. 9,988,112, which is a
(Continued)

(51) Int. Cl.
*B62D 57/032* (2006.01)
*E21B 15/00* (2006.01)
*B62D 57/02* (2006.01)

(52) U.S. Cl.
CPC .......... *B62D 57/032* (2013.01); *B62D 57/02* (2013.01); *E21B 15/003* (2013.01); *E21B 15/006* (2013.01)

(58) Field of Classification Search
CPC .... B62D 57/00; B62D 57/032; B62D 57/022; B62D 57/028; B62D 57/02
(Continued)

(56) References Cited

U.S. PATENT DOCUMENTS 1,001,299 A   8/1911  Page
1,242,635 A  10/1917  Anderson
(Continued)

FOREIGN PATENT DOCUMENTS

CA   2871406   11/2014
CA   2798743    8/2015
(Continued)

OTHER PUBLICATIONS

Schwabe Williamson & Wyatt, PC "Listing of Related Cases", Portland, OR; Dec. 4, 2017; 2 Pages.
(Continued)

*Primary Examiner* — Joseph M Rocca
*Assistant Examiner* — Conan D Duda
(74) *Attorney, Agent, or Firm* — Schwabe Williamson & Wyatt

(57) ABSTRACT

Embodiments of the present invention are directed to a load transporting apparatus that automatically aligns a support foot of the apparatus with a load-bearing frame connected to the load transporting apparatus during a recovery phase of an incremental walking movement. In particular, the load transporting apparatus includes a linking device attached to a support foot of the apparatus and a biasing device connected to the linking device that is deflected during non-linear load transporting movements, where the biasing device acts to automatically return the support foot to an aligned position relative to the load-bearing frame after a non-linear movement has been completed and the support foot is raised above a ground surface.

Other embodiments of the present invention are directed to a load transporting apparatus that automatically centers a support foot of the apparatus about a roller assembly during a recovery phase of an incremental walking movement. In particular, the load transporting apparatus includes guide
(Continued)

devices positioned adjacent to a roller assembly that deflect a biasing device during non-linear load transporting movements, where the biasing device acts to automatically return the support foot to a centered position relative to the roller assembly after a non-linear movement has been completed and the support foot is raised above a ground surface.

20 Claims, 31 Drawing Sheets

Related U.S. Application Data continuation of application No. 15/285,366, filed on Oct. 4, 2016, now Pat. No. 9,862,437, which is a continuation of application No. 14/529,566, filed on Oct. 31, 2014, now Pat. No. 9,533,723, which is a continuation-in-part of application No. 13/909,969, filed on Jun. 4, 2013, now Pat. No. 9,096,282, which is a continuation-in-part of application No. 13/711,269, filed on Dec. 11, 2012, now Pat. No. 8,561,733, and a continuation-in-part of application No. 13/711,315, filed on Dec. 11, 2012, now Pat. No. 8,490,724, and a continuation-in-part of application No. 13/711,193, filed on Dec. 11, 2012, now Pat. No. 8,573,334.

(60) Provisional application No. 61/757,517, filed on Jan. 28, 2013, provisional application No. 61/576,657, filed on Dec. 16, 2011.

(58) Field of Classification Search
USPC .......................................... 180/8.1, 8.5, 8.6
See application file for complete search history.

(56) References Cited

U.S. PATENT DOCUMENTS

| | | |
|---|---|---|
| 1,289,207 A | 12/1918 | Leach |
| 1,429,551 A | 9/1922 | Anderson |
| 1,615,055 A | 1/1927 | Turner |
| 1,627,249 A | 5/1927 | Page |
| 1,692,121 A | 11/1928 | Grant |
| 1,879,446 A | 2/1931 | Page |
| 1,914,692 A | 6/1933 | Kakaska |
| 1,915,134 A | 6/1933 | MacPherson |
| 2,132,184 A | 10/1937 | Poche |
| 2,164,120 A | 6/1939 | Page |
| 2,247,782 A | 7/1941 | Martinson |
| 2,259,200 A | 10/1941 | Cameron et al. |
| 2,290,118 A | 7/1942 | Page |
| 2,380,431 A | 7/1945 | Harding |
| 2,399,375 A | 4/1946 | Mullins |
| 2,452,632 A | 11/1948 | McLeod |
| 2,541,496 A | 2/1951 | Busick, Jr. |
| 2,616,677 A | 11/1952 | Compton |
| 2,660,253 A | 11/1953 | Davidson |
| 2,660,449 A | 11/1953 | MacPherson |
| 2,692,770 A | 10/1954 | Nallinger et al. |
| 2,914,127 A | 8/1955 | Ricouard |
| 2,777,528 A | 1/1957 | Jourdain |
| 2,942,676 A | 12/1957 | Kraus |
| 2,901,240 A | 8/1959 | Fikse |
| 2,935,309 A | 5/1960 | McCarthy |
| 3,078,941 A | 2/1963 | Baron |
| 3,113,661 A | 12/1963 | Linke et al. |
| 3,135,345 A | 6/1964 | Scruggs |
| 3,150,733 A | 9/1964 | Goebel |
| 3,249,168 A | 5/1966 | Klein |
| 3,255,836 A | 6/1966 | Hoppmann et al. |
| 3,265,145 A | 8/1966 | Beitzel |
| 3,334,849 A | 8/1967 | Bronder |
| 3,362,553 A | 1/1968 | Weinmann |
| 3,375,892 A | 4/1968 | Kraschnewski et al. |
| 3,446,301 A | 5/1969 | Thomas |
| 3,448,994 A | 6/1969 | King et al. |
| 3,490,786 A | 1/1970 | Ravenel |
| 3,493,064 A | 2/1970 | Wilson |
| 3,512,597 A | 5/1970 | Baron |
| 3,527,313 A | 9/1970 | Reimann |
| 3,528,341 A | 9/1970 | Rieschel |
| 3,576,225 A | 4/1971 | Chambers |
| 3,595,322 A | 7/1971 | Reimann |
| 3,612,201 A | 10/1971 | Smith |
| 3,638,747 A | 2/1972 | Althoff |
| 3,674,103 A | 7/1972 | Kiekhaefer |
| 3,734,220 A | 5/1973 | Smith |
| 3,754,361 A | 8/1973 | Branham |
| 3,765,499 A | 10/1973 | Harmala |
| 3,767,064 A | 10/1973 | Lutz |
| 3,767,224 A | 10/1973 | Schneeweiss |
| 3,796,276 A | 3/1974 | Maeda |
| 3,807,519 A | 4/1974 | Patch |
| 3,853,196 A | 12/1974 | Guest |
| 3,866,425 A | 2/1975 | Morrice |
| 3,866,835 A | 2/1975 | Dowd |
| 3,921,739 A | 11/1975 | Rich et al. |
| 3,951,225 A | 4/1976 | Schewenk |
| 4,014,399 A | 3/1977 | Ruder |
| 4,021,978 A | 5/1977 | Busse |
| 4,048,936 A | 9/1977 | Uchizono |
| RE29,541 E | 2/1978 | Russell |
| 4,135,340 A | 1/1979 | Cox |
| 4,206,935 A | 6/1980 | Sheppard et al. |
| 4,252,204 A | 2/1981 | Bishop |
| 4,290,495 A | 9/1981 | Elliston |
| 4,296,820 A | 10/1981 | Loftis |
| 4,324,077 A | 4/1982 | Woolslayer |
| 4,324,302 A | 4/1982 | Rabinovitch |
| 4,334,587 A | 6/1982 | Rangaswamy |
| 4,371,041 A | 2/1983 | Becker |
| 4,375,892 A | 3/1983 | Jenkins |
| 4,405,019 A | 9/1983 | Frisbee |
| 4,406,339 A | 9/1983 | Spencer |
| 4,423,560 A | 1/1984 | Rivinius |
| 4,489,954 A | 12/1984 | Yasui et al. |
| 4,491,449 A | 1/1985 | Hawkins |
| 4,555,032 A | 11/1985 | Mick |
| 4,655,467 A | 4/1987 | Kitzmiller et al. |
| 4,759,414 A | 7/1988 | Willis |
| 4,821,816 A | 4/1989 | Willis |
| 4,823,870 A | 4/1989 | Sorokan |
| 4,831,795 A | 5/1989 | Sorokan |
| 4,842,298 A | 6/1989 | Jarvis |
| 5,015,147 A | 5/1991 | Taylor |
| 5,178,406 A | 1/1993 | Reynolds |
| 5,245,882 A | 9/1993 | Kallenberger |
| 5,248,005 A | 9/1993 | Mochizuki |
| 5,398,396 A | 3/1995 | Sanders |
| 5,492,436 A | 2/1996 | Suksumake |
| 5,575,346 A | 11/1996 | Yberle |
| 5,600,905 A | 2/1997 | Kallenberger |
| 5,603,174 A | 2/1997 | Kallenberger |
| 5,613,444 A | 3/1997 | Ahmadian et al. |
| 5,749,596 A | 5/1998 | Jensen et al. |
| 5,794,723 A | 8/1998 | Caneer |
| 5,921,336 A | 7/1999 | Reed |
| 6,089,583 A | 7/2000 | Taipale |
| 6,202,774 B1 | 3/2001 | Claassen et al. |
| 6,203,247 B1 | 3/2001 | Schellstede |
| 6,345,831 B1 | 2/2002 | deMarcellus |
| 6,474,926 B2 | 11/2002 | Weiss |
| 6,554,145 B1 | 4/2003 | Fantuzzi |
| 6,554,305 B2 | 4/2003 | Fulks |
| 6,581,525 B2 | 6/2003 | Smith |
| 6,612,781 B1 | 9/2003 | Jackson |
| 6,651,991 B2 | 11/2003 | Carlstedt et al. |
| 6,820,887 B1 | 11/2004 | Riggle |
| 6,857,483 B1 | 2/2005 | Dirks |
| 6,962,030 B2 | 11/2005 | Conn |
| 7,182,163 B1 | 2/2007 | Gipson |
| 7,308,953 B2 | 12/2007 | Barnes |
| 7,357,616 B2 | 4/2008 | Andrews |

(56) References Cited

U.S. PATENT DOCUMENTS

| | | |
|---|---|---|
| 7,681,674 B1 | 3/2010 | Barnes et al. |
| 7,806,207 B1 | 10/2010 | Barnes et al. |
| 7,819,209 B1 | 10/2010 | Bezner |
| 7,882,915 B1 | 2/2011 | Wishart |
| 8,019,472 B2 | 9/2011 | Montero |
| 8,051,930 B1 | 11/2011 | Barnes et al. |
| 8,250,816 B2 | 8/2012 | Donnally |
| 8,468,753 B2 | 6/2013 | Donnally |
| 8,490,724 B2 | 7/2013 | Smith et al. |
| 8,490,727 B2 | 7/2013 | Smith et al. |
| 8,556,003 B2 | 10/2013 | Souchek |
| 8,561,733 B2 | 10/2013 | Smith et al. |
| 8,573,334 B2 | 11/2013 | Smith |
| 8,646,549 B2 | 2/2014 | Ledbetter |
| 8,646,976 B2 | 2/2014 | Stoik |
| 8,839,892 B2 | 9/2014 | Smith et al. |
| 8,887,800 B2 | 11/2014 | Havinga |
| 9,004,203 B2 | 4/2015 | Smith |
| 9,045,178 B2 | 6/2015 | Smith |
| 9,096,282 B2 | 8/2015 | Smith et al. |
| 9,463,833 B2 | 10/2016 | Smith et al. |
| 9,533,723 B2 | 1/2017 | Smith et al. |
| 9,751,578 B2 | 9/2017 | Smith |
| 9,862,437 B2 | 1/2018 | Smith et al. |
| RE46,723 E | 2/2018 | Smith et al. |
| 2002/0185319 A1 | 12/2002 | Smith |
| 2004/0211598 A1 | 10/2004 | Palidis |
| 2004/0240973 A1 | 12/2004 | Andrews |
| 2006/0027373 A1 | 2/2006 | Carriere |
| 2006/0213653 A1 | 9/2006 | Cunningham |
| 2009/0000218 A1 | 1/2009 | Lee |
| 2009/0188677 A1 | 7/2009 | Ditta |
| 2009/0200856 A1 | 8/2009 | Chehade |
| 2009/0283324 A1 | 11/2009 | Konduc |
| 2010/0252395 A1 | 10/2010 | Lehtonen |
| 2011/0072737 A1 | 3/2011 | Wasterval |
| 2011/0114386 A1 | 5/2011 | Souchek |
| 2012/0219242 A1 | 8/2012 | Stoik |
| 2013/0153309 A1 | 6/2013 | Smith et al. |
| 2013/0156538 A1 | 6/2013 | Smith et al. |
| 2013/0156539 A1 | 6/2013 | Smith et al. |
| 2013/0277124 A1 | 10/2013 | Smith et al. |
| 2014/0014417 A1 | 1/2014 | Smith et al. |
| 2014/0054097 A1 | 2/2014 | Bryant |
| 2014/0158342 A1 | 6/2014 | Smith |
| 2014/0161581 A1 | 6/2014 | Smith et al. |
| 2015/0053426 A1 | 2/2015 | Smith et al. |
| 2015/0166134 A1 | 6/2015 | Trevithick |
| 2016/0176255 A1 | 6/2016 | Guiboche |
| 2016/0221620 A1 | 8/2016 | Smith |
| 2016/0297488 A1 | 10/2016 | Smith |
| 2017/0021880 A1 | 1/2017 | Smith |
| 2017/0101144 A1 | 4/2017 | Higginbotham, II |
| 2017/0327166 A1 | 11/2017 | Smith |

FOREIGN PATENT DOCUMENTS

| | | |
|---|---|---|
| CA | 2798774 | 9/2015 |
| CA | 2798790 | 10/2015 |
| CH | 359422 | 1/1962 |
| CN | 1515477 | 7/2003 |
| DE | 2418411 | 10/1975 |
| DE | 4107314 | 9/1992 |
| EP | 469182 | 10/1990 |
| GB | 2315464 | 2/1998 |
| WO | 2004103807 | 12/2004 |
| WO | 2006100166 | 9/2006 |
| WO | 2010136713 | 12/2010 |

OTHER PUBLICATIONS

Notice of Pending Litigation Under 37 CFR 1.56 Pursuant to Granted Request for Prioritized Examination Under 37 CFR 1.102€(1), Jun. 28, 2016.

Defendants' First Amended Answer, Affirmative Defenses, and Counterclaims to Plaintiff's Complain for Patent Infringement, Jun. 27, 2016, p. 9, section 16.

Defendants' Answer, Affirmative Defenses, and Counterclaims to Plaintiff's Complaint for Patent Infringement, Jun. 6, 2016, p. 6, Section 2.

Entro Industries, Inc. brochure "The Future of Rig Walkers", Jun. 2012; 4 pages.

Columbia Industries, LLC brochure "Kodiak Cub Rig Walking System", 2009; 4 pages.

Defendants' Second Amended Answer, Affirmative Defenses, and Counterclaims to Plaintiff's Complain for Patent Infringement, Jul. 12, 2016, p. 9, Sections 15-18.

Defendant Hydraulic System, Inc.'s Preliminary Invalidity Contentions, Nov. 18, 2016, pp. 1-6.

Defendant Hydraulic System, Inc.'s Preliminary Invalidity Contentions, May 26, 2017, pp. 1-6.

Colby, Col. Joseph M., "Torsion-Bar Suspension", SAE Quarterly Transactions, vol. 2, No. 2, pp. 195-200, Apr. 1948.

Airstream Inc., "Airstream's New Dura-Torque Axle" Pamphlet.

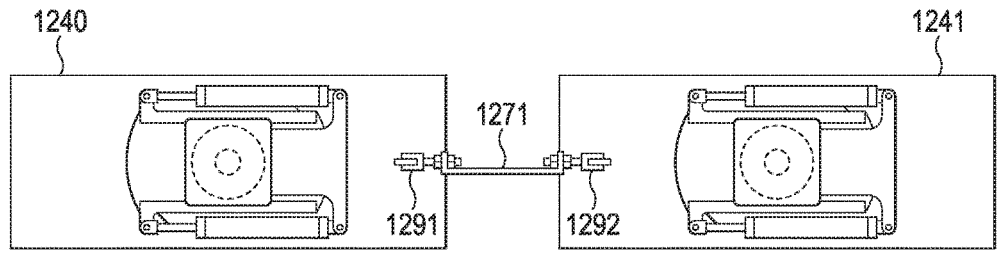
FIG. 12A
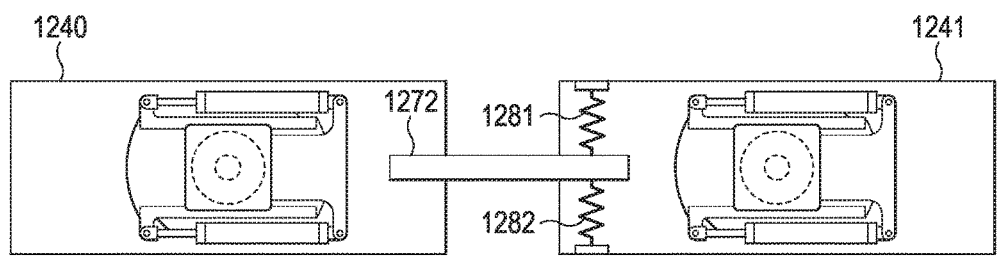
FIG. 12B
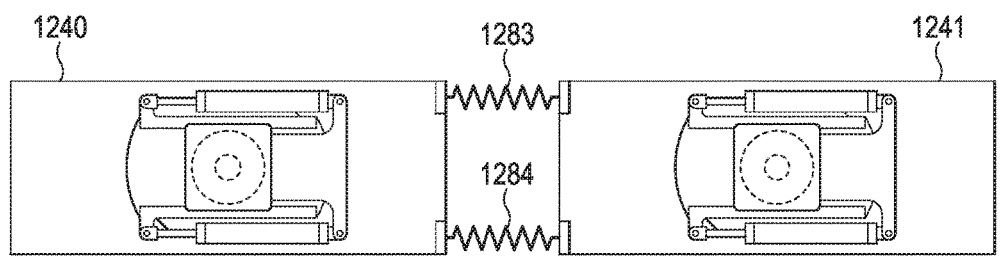
FIG. 12C
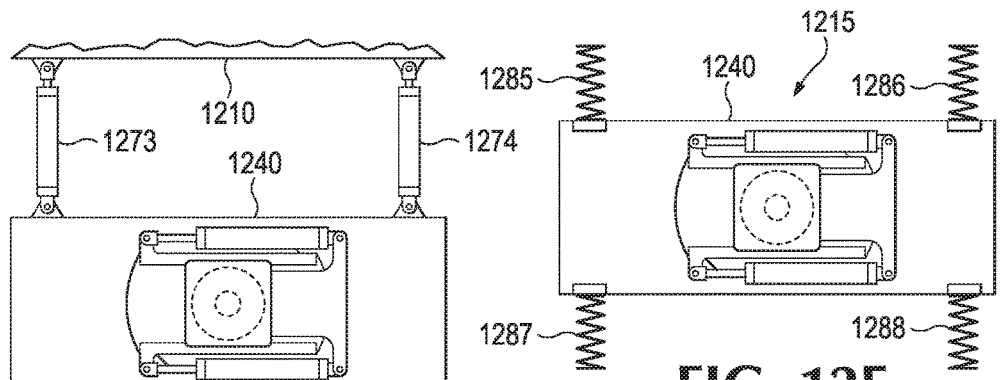
FIG. 12D
FIG. 12E

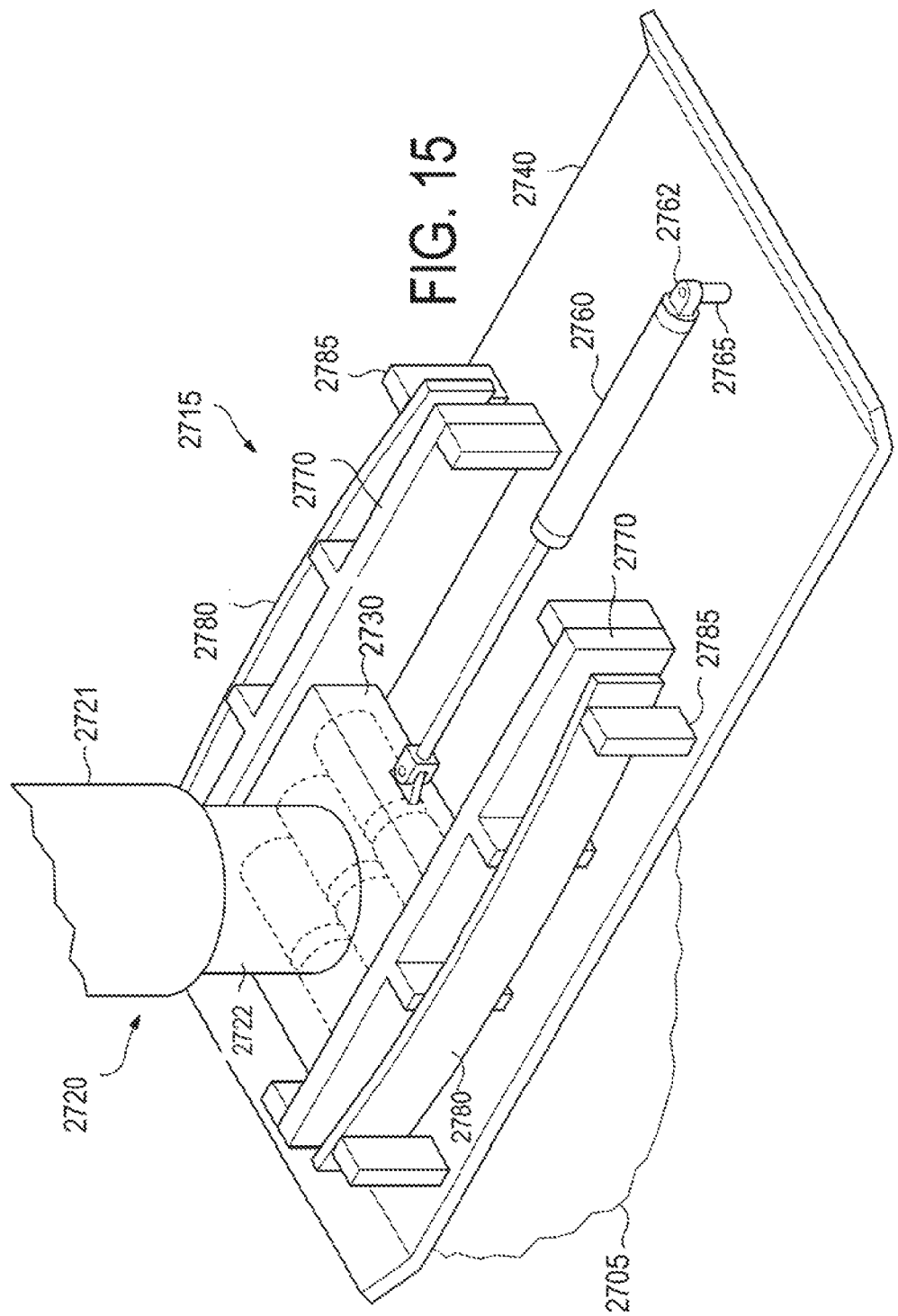

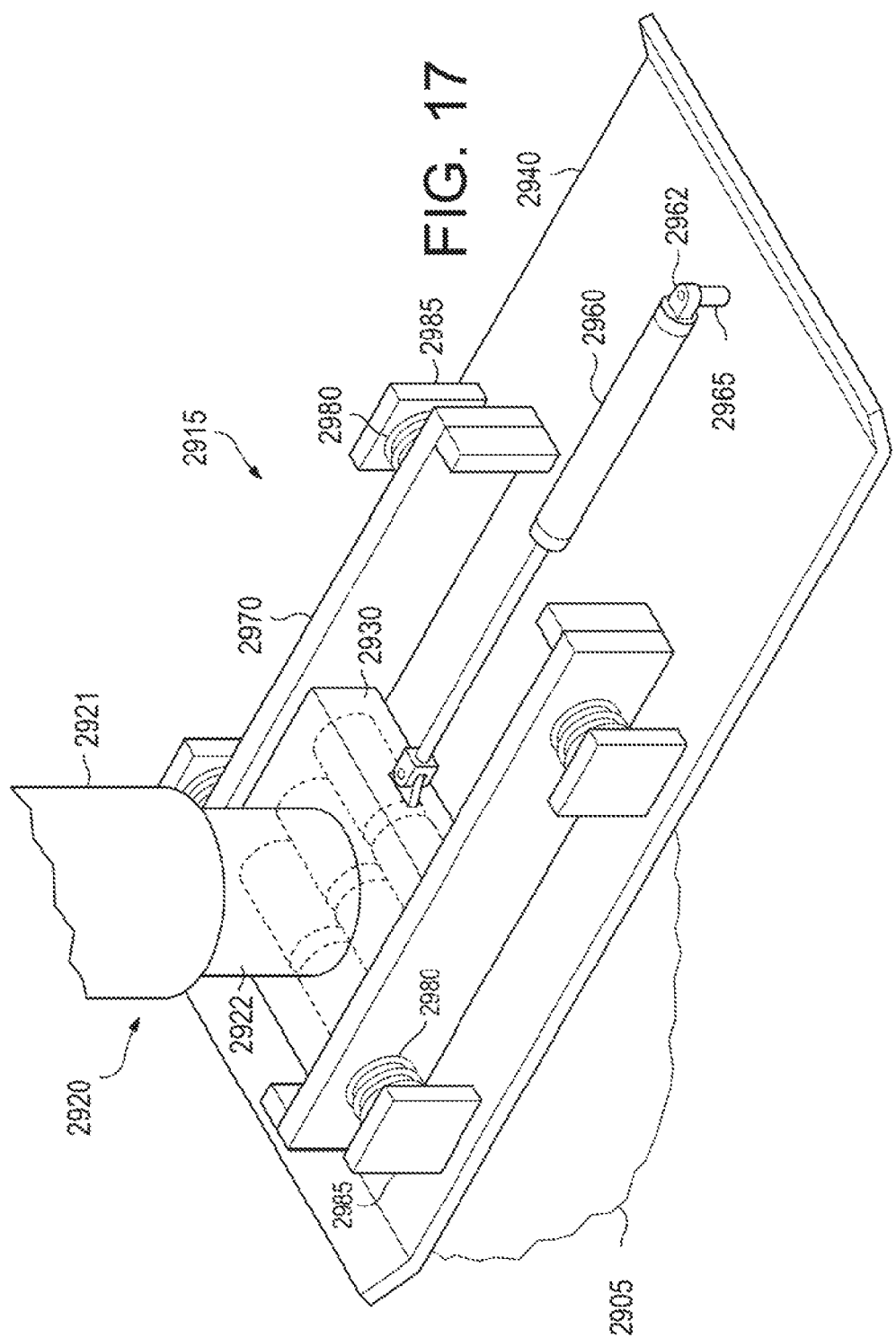

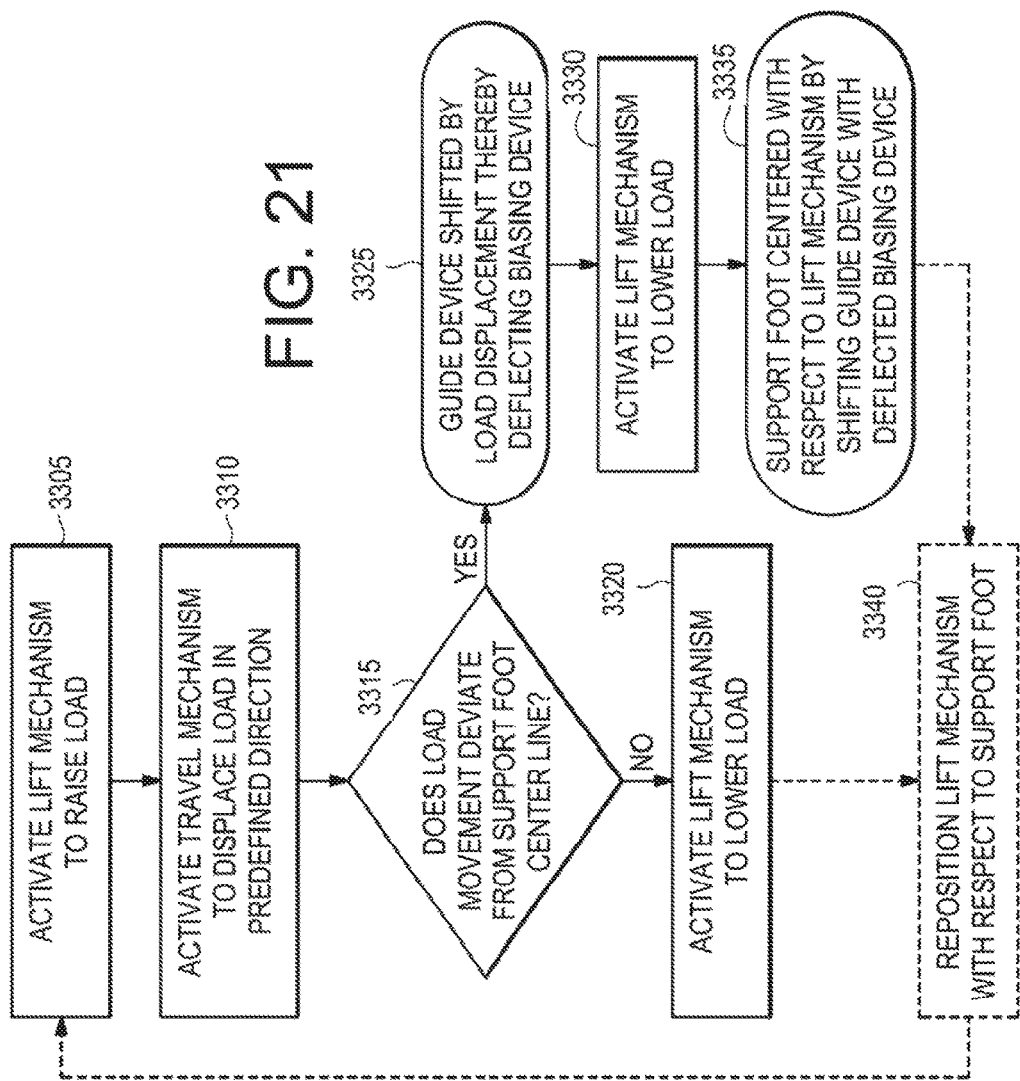

MOUNTING STRUCTURE WITH STORABLE TRANSPORT SYSTEM

STATEMENT OF RELATED MATTERS

This application is a continuation of U.S. patent application Ser. No. 15/828,073, filed Nov. 30, 2017, which is a continuation of U.S. patent application Ser. No. 15/285,366, filed Oct. 4, 2016, now U.S. Pat. No. 9,862,437, issued Jan. 9, 2018, which claims priority to and is a continuation of U.S. patent application Ser. No. 14/529,566, filed Oct. 31, 2014, now U.S. Pat. No. 9,533,723, issued Jan. 3, 2017. U.S. patent application Ser. No. 14/529,566 is a continuation-in-part of U.S. patent application Ser. No. 13/909,969, filed Jun. 4, 2013, now U.S. Pat. No. 9,096,282, issued Aug. 4, 2015, which claims priority to U.S. Provisional Application No. 61/757,517, filed Jan. 28, 2013. U.S. patent application Ser. No. 13/909,969 is a continuation-in-part of U.S. patent application Ser. No. 13/711,193, filed Dec. 11, 2012, now U.S. Pat. No. 8,573,334, issued Nov. 5, 2013, which claims priority to U.S. Provisional Application No. 61/576,657, filed Dec. 16, 2011. U.S. patent application Ser. No. 13/909,969 is also a continuation-in-part of U.S. patent application Ser. No. 13/711,269, filed Dec. 11, 2012, now U.S. Pat. No. 8,561,733, issued Oct. 22, 2013, which claims priority to U.S. Provisional Application No. 61/576,657, filed Dec. 16, 2011. Additionally, U.S. patent application Ser. No. 13/909,969 is a continuation-in-part of U.S. patent application Ser. No. 13/711,315, filed Dec. 11, 2012, now U.S. Pat. No. 8,490,724, issued Jul. 23, 2013, which claims priority to U.S. Provisional Application No. 61/576,657, filed Dec. 16, 2011. The contents of all the above patents and patent applications are herein incorporated by reference in their entireties.

FIELD OF THE INVENTION

This disclosure relates generally to apparatuses for transporting a load, and more particularly to apparatuses for moving heavy loads over small distances with the ability to fine tune the resultant position of the heavy load.

BACKGROUND

Moving extremely heavy loads has generally been a complicated task because the large forces involved in lifting and transporting the heavy loads. When possible, large loads are often transported by disassembling or breaking up the load into multiple smaller loads. However, this break-down and subsequent reassembly process can be very time consuming, especially when a heavy load is only to be moved a small distance, or needs to be repositioned.

For heavy loads that need periodic movement or adjustment, devices commonly referred to as "walking machines" or "walkers" were developed. These machines typically move the heavy loads over small distances in incremental stages. Walking machines are particularly useful for moving large structures, such as oil rigs, which often times need to be moved in order to properly position them over pre-drilled pipes in oil fields, or moved to a new location that is undergoing oil exploration.

Instead of using wheels driven by rotational forces to move heavy loads, walking machines typically use hydraulic lift cylinders to lift the load above a supporting surface, and then move or rotate the load relative to the supporting surface by transporting the load via rollers or tracks in the walking machines. U.S. Pat. No. 5,921,336 to Reed and U.S. Pat. No. 6,581,525 to Smith show two methods of using walking machines to move heavy loads, such as oil rig structures. The '525 patent shows elongated beams under several rollers and lift cylinders, which allows the load from the lift cylinders and rollers to be spread over a large area. However, this disclosed system in the '525 patent does not allow for movement of heavy load in a direction perpendicular to the long axis of the support beams. That is, movement of the heavy load is restricted in the walking device disclosed in the '525 patent to only particular directions, which can make fine tuning of the position of the heavy load difficult.

SUMMARY

Embodiments of the present invention are directed to a load transporting apparatus that automatically aligns a support foot of the apparatus with a load-bearing frame connected to the load transporting apparatus during a recovery phase of an incremental walking movement. In particular, the load transporting apparatus includes a linking device attached to a support foot of the apparatus and a biasing device connected to the linking device that is deflected during non-linear load transporting movements, where the biasing device acts to automatically return the support foot to an aligned position relative to the load-bearing frame after a non-linear movement has been completed and the support foot is raised above a ground surface.

Other embodiments of the present invention are directed to a load transporting apparatus that automatically centers a support foot of the apparatus about a roller assembly during a recovery phase of an incremental walking movement. In particular, the load transporting apparatus includes guide devices positioned adjacent to a roller assembly that deflect a biasing device during non-linear load transporting movements, where the biasing device acts to automatically return the support foot to a centered position relative to the roller assembly after a non-linear movement has been completed and the support foot is raised above a ground surface.

BRIEF DESCRIPTION OF THE DRAWINGS

FIGS. 12A, 12B, 12C, 12D, and 12E are diagrams of walking apparatuses with various alignment restoration devices according to embodiments of the invention.

FIG. 15 is a perspective view of an example walking apparatus according to embodiments of the invention.

FIG. 17 is a perspective view of another example walking apparatus according to embodiments of the invention.

FIG. 21 is a flow diagram illustrating method of operating a load transporting apparatus according to embodiments of the invention.

DETAILED DESCRIPTION

As described above, walkers, or walking machines, are vehicles that are used for transporting very heavy loads, such as entire oil well drilling rigs. Such loads may be as great as several thousand tons and may be required to be sequentially positioned very precisely over spaced-apart well bores, for example. Embodiments of the present concept are directed to load transporting apparatuses, such as walking machines, for moving heavy loads over small distances with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

Figure 1A:
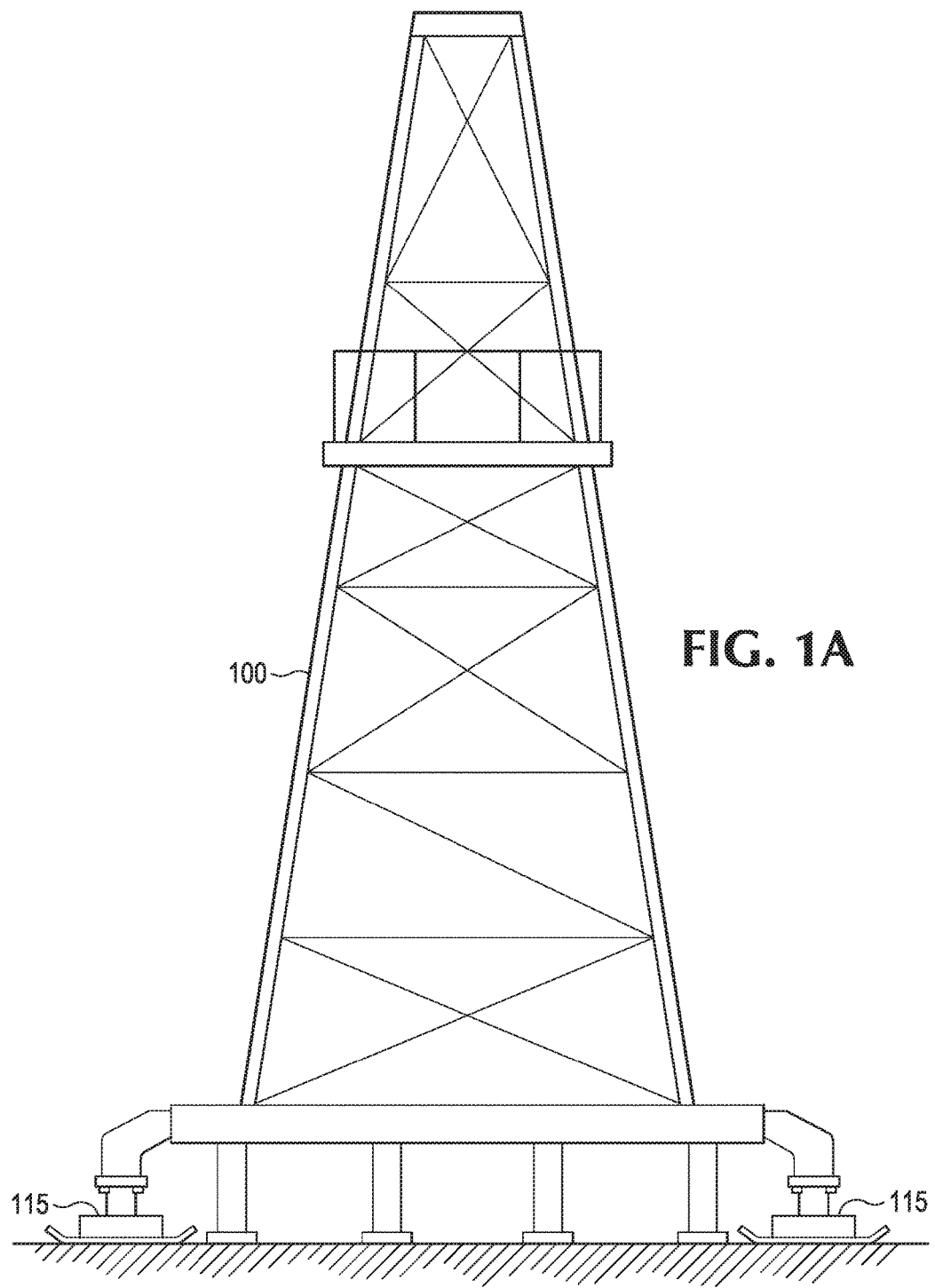
FIGS. 1A and 1B are diagrams of walking apparatuses attached to various loads according to embodiments of the invention.
Figure 1B:
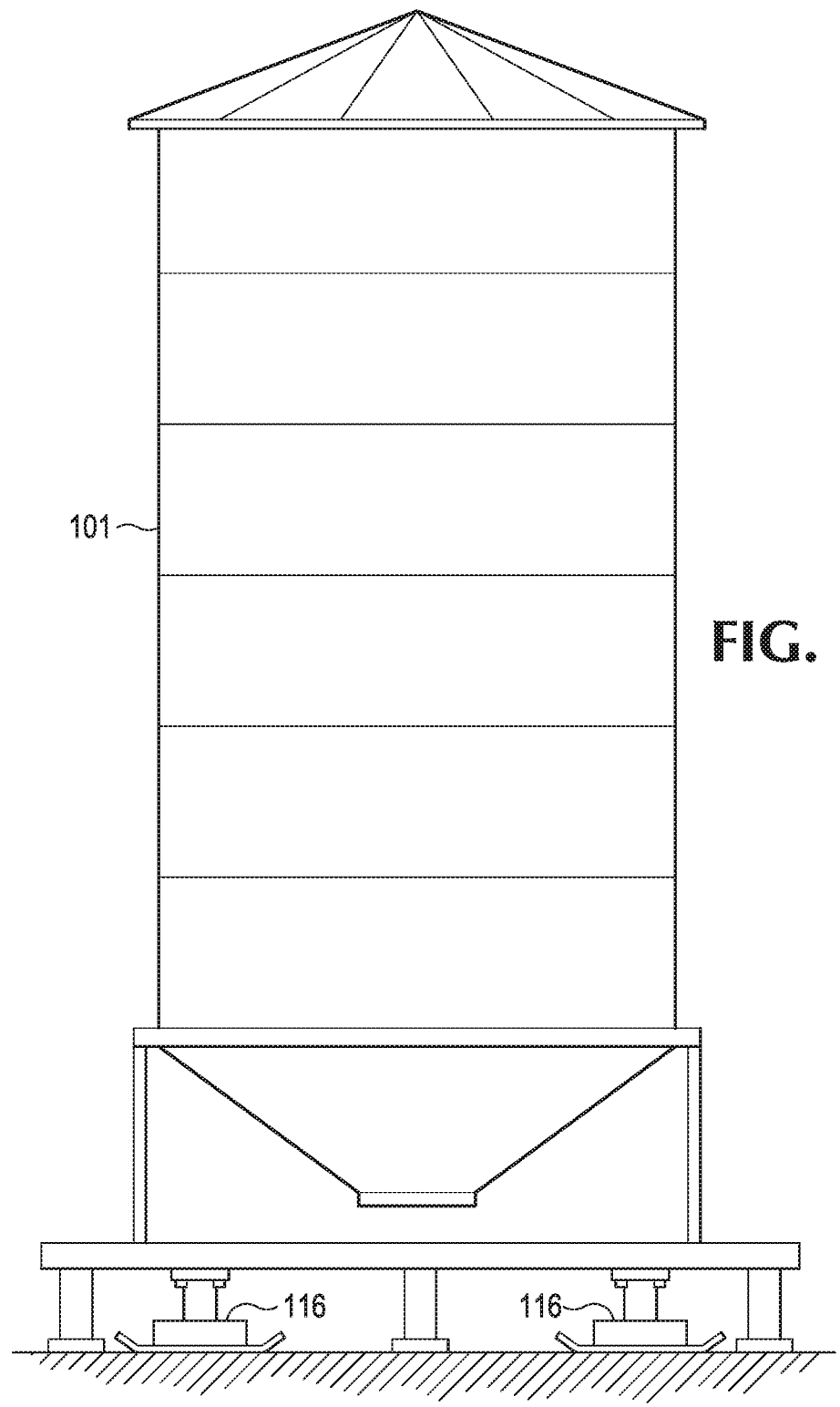

For example, with reference FIGS. 1A and 1B, a load transporting system includes multiple walking machines that support a load being carried by the load transporting system. FIGS. 1A and 1B show examples of walking apparatuses attached to various loads according to embodiments of the invention. Referring to FIG. 1A, multiple walking apparatuses 115 are positioned under or adjacent to an oil rig 100. Typically, walking machines 115 are positioned at least near edge portions of a load 100 to balance the weight of the load over the various walking machines. However, specific situations may dictate that walking machines 115 are positioned in various other locations relative to the load 100.

Referring to FIG. 1B, multiple walking apparatuses 116 are positioned under or adjacent to a silo 101. Although an oil rig load 100 and a silo 101 are respectively illustrated in FIGS. 1A and 1B, walking machines may be used to move any type of relatively large load, such as bridge sections, ship sections, structures, etc. Additionally, although two walking machines are shown in FIGS. 1A and 1B, more or fewer walking machines may be used to move loads 100, 101.

Figure 2A:
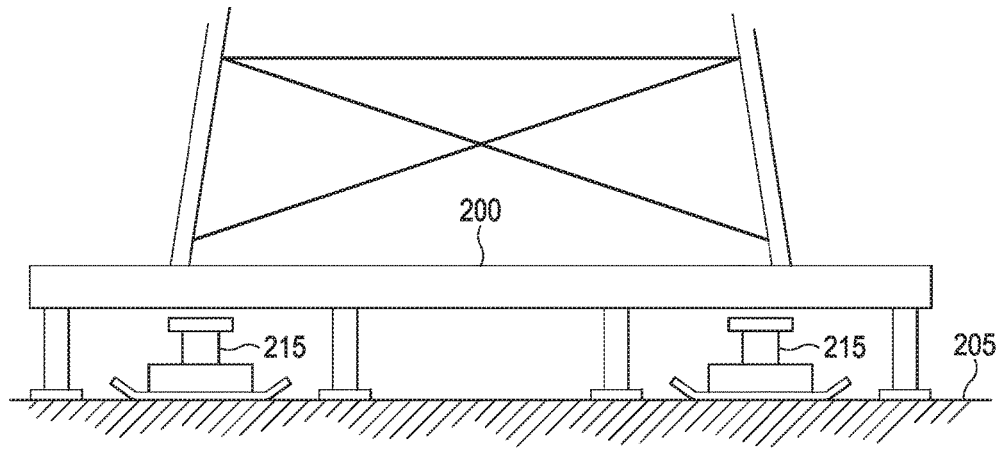
FIGS. 2A, 2B, 2C, 2D, 2E, and 2F are detail diagrams showing an example operational progression of walking apparatuses to move a load according to embodiments of the invention.
Figure 2B:
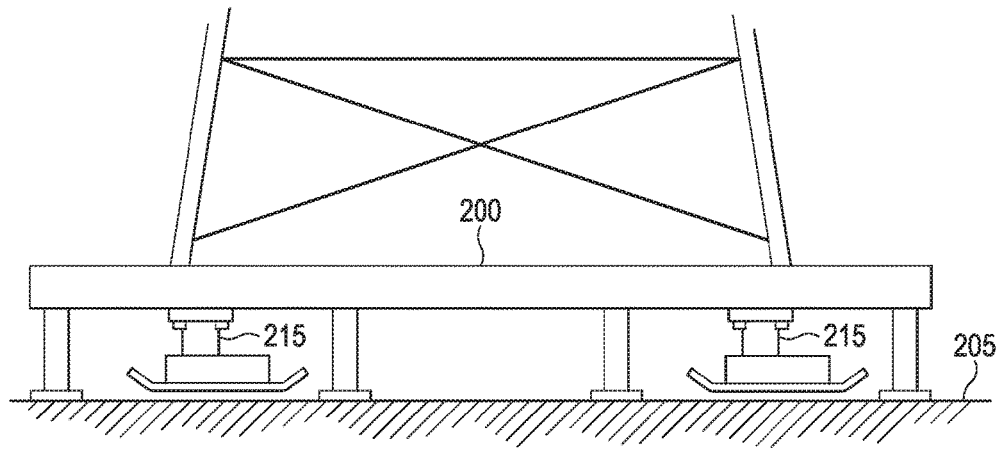
Figure 2C:
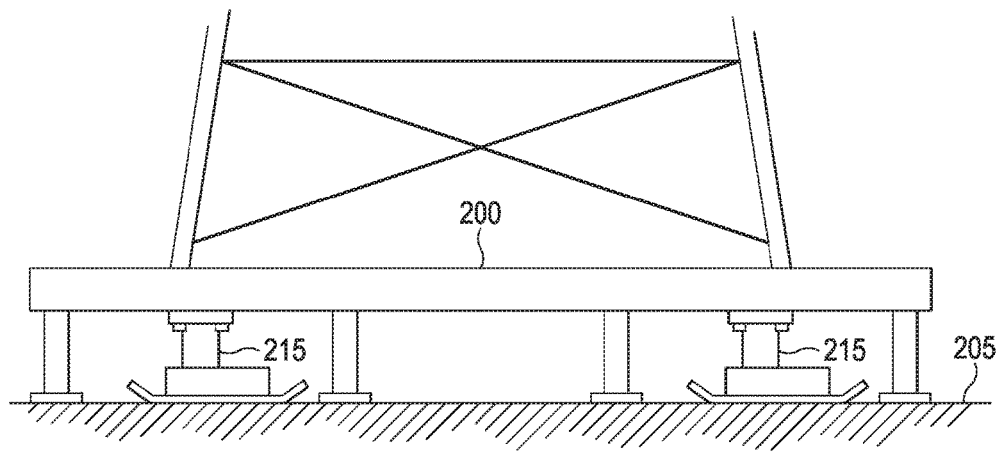

FIGS. 2A-2F provide an overview of an example operation of walking apparatuses to move a load according to embodiments of the invention. Referring to FIGS. 2A, walking apparatuses 215 are positioned on a base surface 205 below or adjacent to a load 200. Referring to FIG. 2B, the walking apparatuses 215 are attached to the load 200, and are positioned above a base surface 205. As described below, there are many possible connection variations that can be used to connect the walking apparatuses to a load 200. Referring to FIG. 2C, the walking apparatuses 215 are operated so that a foot portion of the walking apparatus contacts the base surface 205. The walking apparatuses 215 may be operated substantially simultaneously, or may be operated in intervals depending on the conditions of the base surface 205 and the load 200 that is to be moved.

Figure 2D:
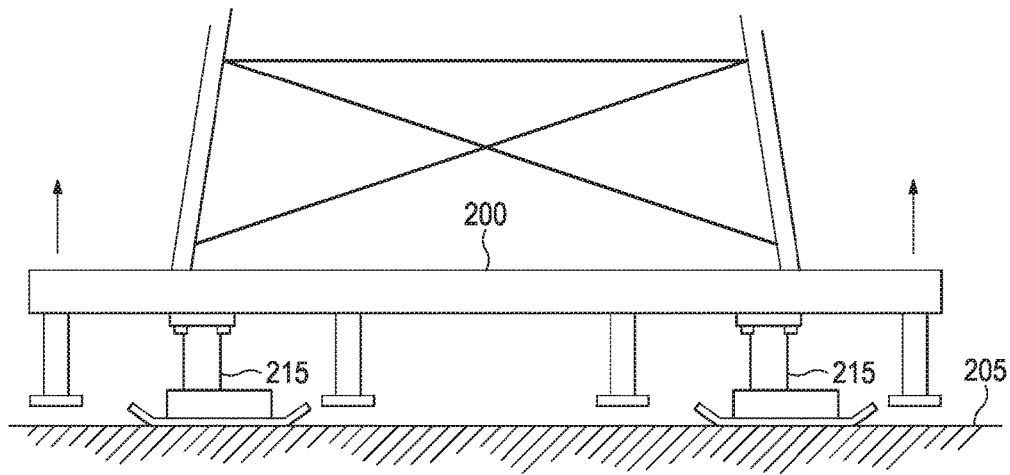

Referring to FIG. 2D, the walking apparatuses 215 are operated to lift the load 200 above the base surface 205. The walking apparatuses 215 may again be operated substantially simultaneously to lift the load 200, or may be operated in intervals depending on the conditions associated with the desired move.

Figure 2E:
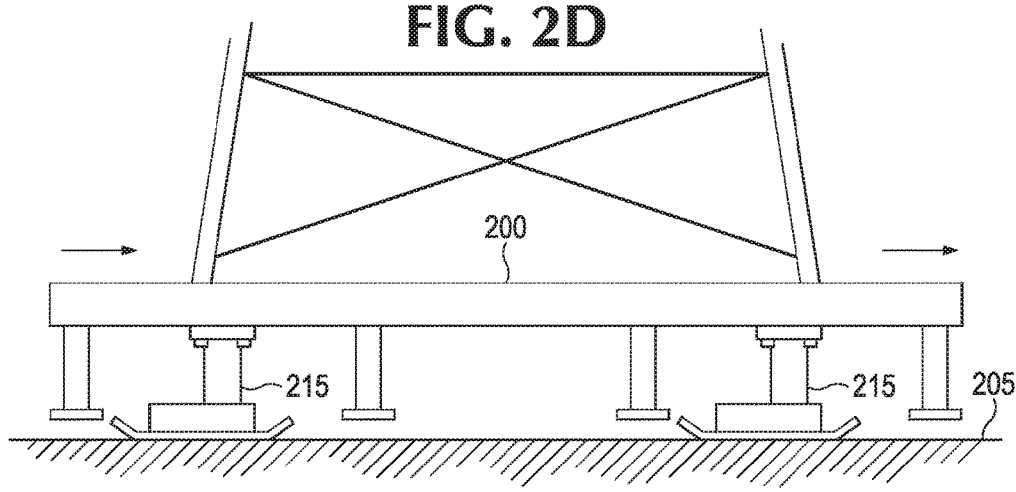
Figure 2F:
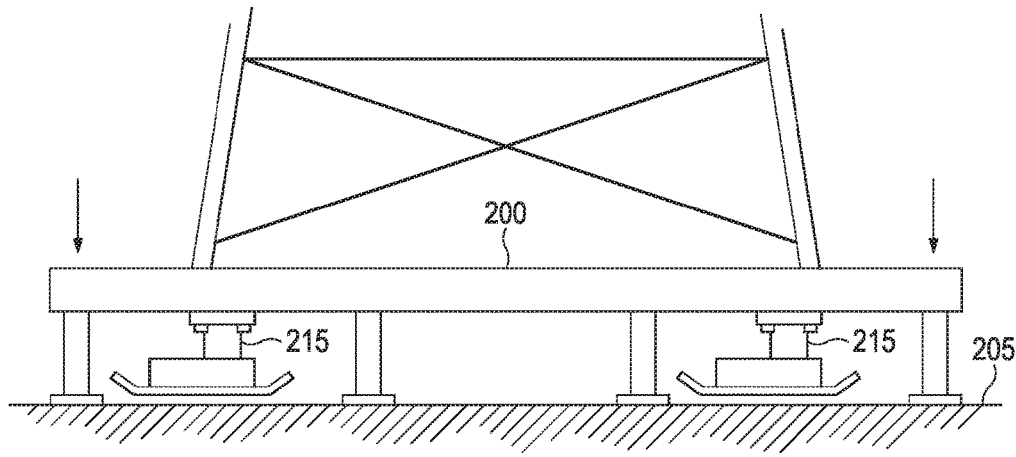

Referring to FIG. 2E, the walking apparatuses 215 are operated to move the load 200 to the right. Although FIG. 2E shows the load 200 being moved to the right, the walking apparatuses can be operated to move the load in a variety of directions depending on the desired final location of the load. Referring to FIG. 2F, the walking apparatuses 215 are operated to lower the load 200 to the base surface 205 and to raise the foot portions of the walking apparatuses above the base surface. That is, after the load 200 is positioned on the base surface 205, the walking apparatuses 215 are further operated so that they are raised above the base surface. Here, the connection between the walking apparatuses 215 and the load 200 support the walking apparatuses 215 when they are raised above the base surface 205. After the walking apparatuses 215 are raised above the base surface 205, they are further operated to be repositioned for another movement walking step, such as by moving the foot portions of the walking apparatuses to the right so that they are in a position as shown in FIG. 2B. That is, the base surface touching part of the walking apparatuses 215 (e.g., the support foot and related structures) is moved to the right while the walking apparatuses 215 are raised above the base surface 205. After the walking apparatuses 215 have been repositioned, they are operated to be lowered to the base surface 205 as shown in FIG. 2C. This completes a single walking cycle, and further walking cycles or steps can be performed by repeating the steps described above with respect to FIGS. 2D to 2F.

Figure 3A:
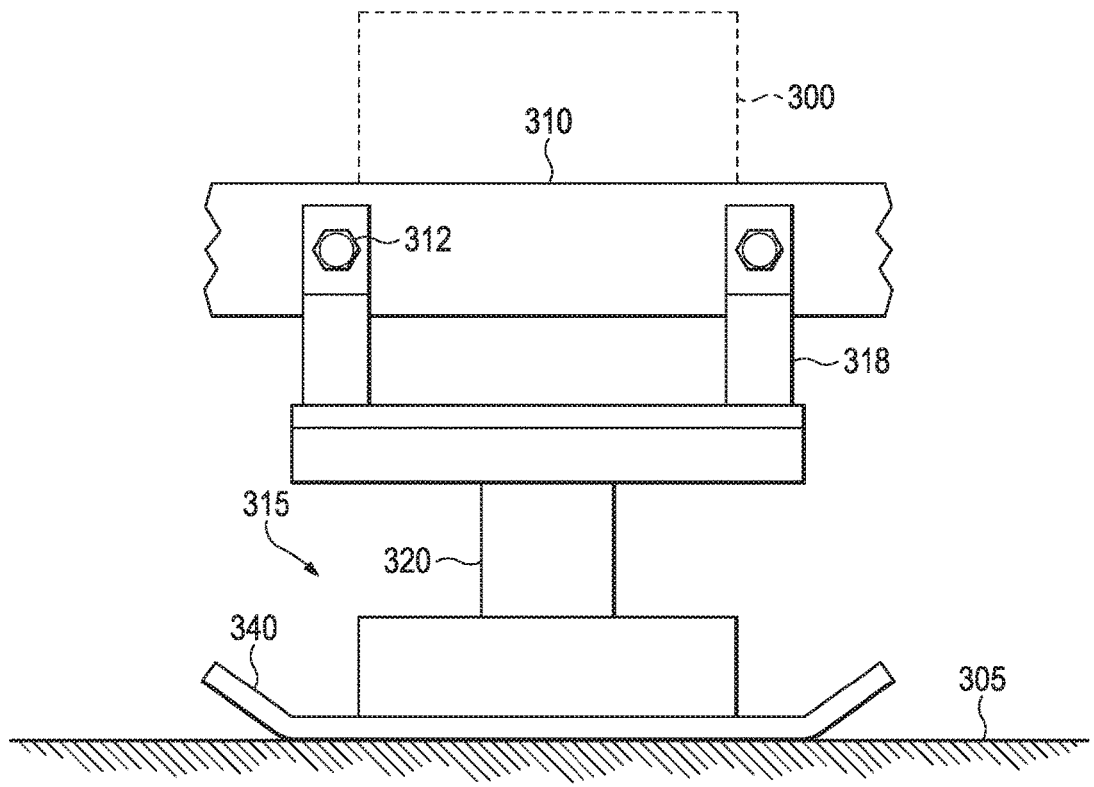
FIGS. 3A and 3B are diagrams illustrating example connection arrangements used to connect a walking apparatus to a load according to embodiments of the invention.
Figure 3B:
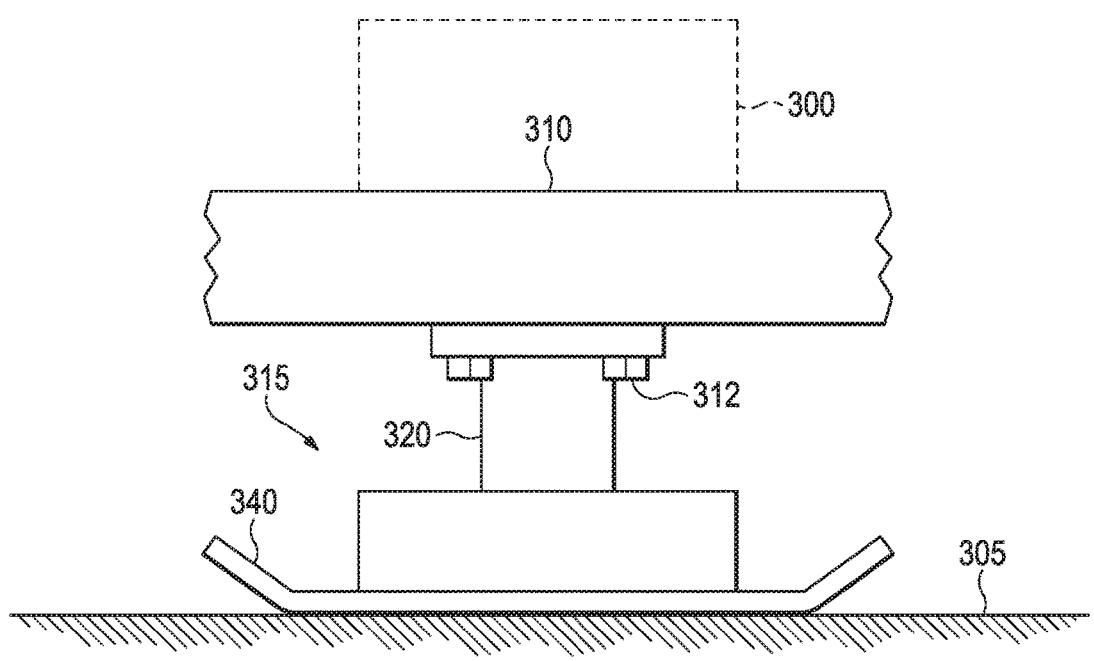

As mentioned above, walking apparatuses can be connected to loads in a variety of ways depending on the specific conditions surrounding the load. FIGS. 3A and 3B illustrate two such connection schemes. Although two connection schemes are illustrated in FIGS. 3A and 3B, embodiments of the invention are not limited to such connection schemes, as many different connection variations exist and are included in the scope of this concept.

Referring to FIG. 3A, a walking apparatus 315 includes a support foot 340 to interface with a base surface 305 and a lift mechanism 320 to raise and lower a load 300. In the embodiment shown in FIG. 3A, the lift mechanism 320 of the walking apparatus 315 is attached to a connection frame 318, which in turn is bolted to framework 310 supporting the load 300 with bolts 312 or other connection mechanisms. In some embodiments, the connection frame 318 may be part of the walking apparatus 315 and in some instances, may be permanently welded, bolted, or otherwise connected to the lift mechanism 320 of the walking apparatus. In other embodiments, the connection frame 318 may be separate from the walking apparatus 315, and may only be temporarily used with the walking apparatus in certain situations. In these embodiments, for example, multiple different connection frames 318 may be built or used with specific load conditions or specifications.

FIG. 3B shows different embodiments where the portions of a lift mechanism 320 of a walking apparatus 315 are directly connected to a support frame 310 structured to support a load 300 with bolts 312 or other connection mechanisms. The support frame 310 may be considered part of the load 300 in some instances where it is a permanent part of the load structure. For example, in instances where the load is a silo, such as shown in FIG. 1B, the metal frame of the silo may be considered the support frame 310 of the load 300, while also being part of the silo, and hence part of the load. In other cases, the support framework 310 may be an ancillary structure that is only used to stabilize and support the load 300 during movement of the load.

Figure 4:
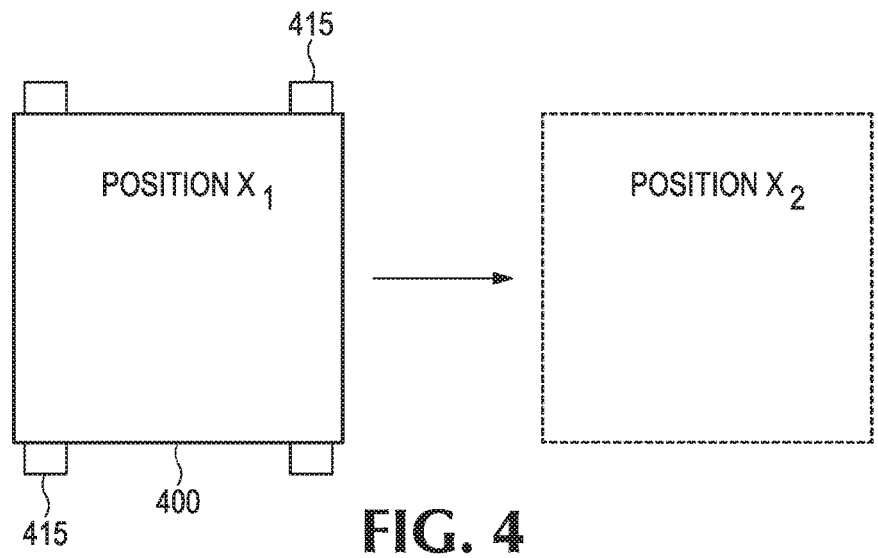
FIG. 4 is a schematic diagram illustrating movement of a load along a substantially linear path according to embodiments of the invention.

FIG. 4 is a schematic diagram illustrating movement of a load along a substantially linear path according to embodiments of the invention. Referring to FIG. 4, a load 400 is connected to multiple walking apparatuses 415, which are used to move the load from an initial position $X_1$ to a final position $X_2$ along a substantially linear path. Here, that path is a horizontal path moving from left to right. This type of basis linear movement can be accomplished by a variety of walking systems.

Figure 5:
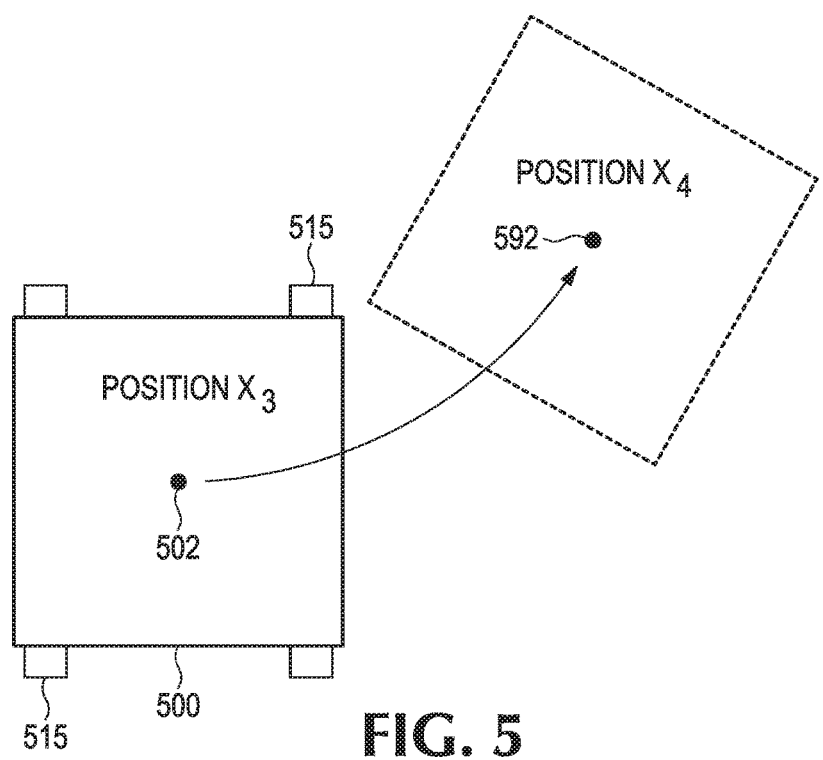
FIG. 5 is a schematic diagram illustrating movement of a load along a curved path according to embodiments of the invention.

FIG. 5 is a schematic diagram illustrating movement of a load along a curved path according to embodiments of the invention. Referring to FIG. 5, a load 500 is connected to multiple walking apparatuses 515, which are used to move the load from an initial position $X_3$ to a final position $X_4$ along a non-linear path. Here, a reference center-point 502 of the load 500 at the initial position $X_3$ is moved to a reference center-point 592 of the load 500 at the final position $X_4$. Unlike the linear movement shown in FIG. 4, this curved path of travel shown in FIG. 5 requires that the walking apparatuses be steered, which can be accomplished using embodiments of the inventive walking apparatuses described below.

Figure 6:
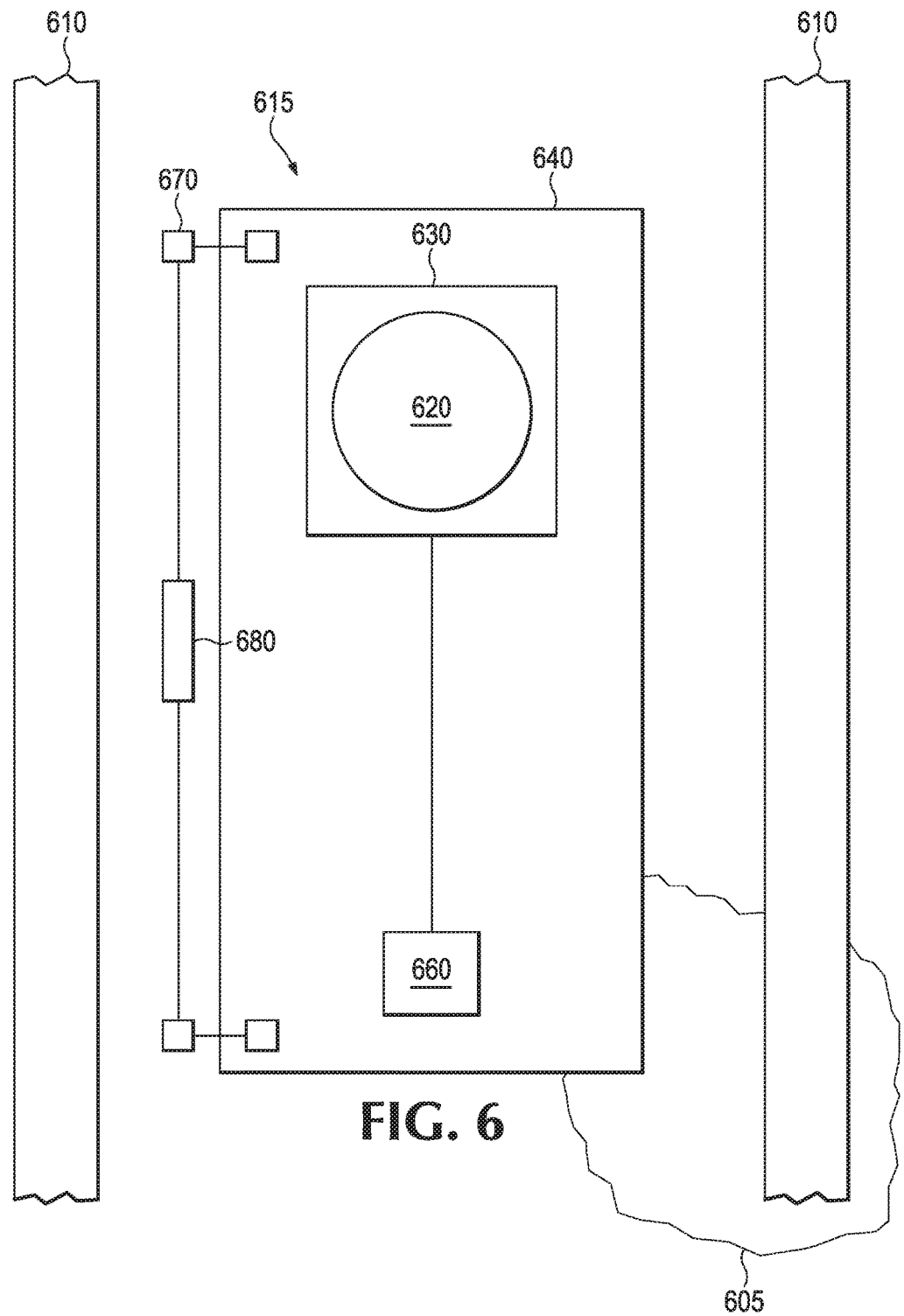
FIG. 6 is a schematic diagram of a top view of a walking apparatus according to embodiments of the invention.

FIG. 6 is a schematic diagram of a top view of a walking apparatus according to embodiments of the invention. Referring to FIG. 6, a load transporting apparatus 615 is configured to move a load (e.g., element 100 FIG. 1) over a base surface 605 in one or more incremental steps each including a load-movement phase and a recovery phase. The load transporting apparatus 615 includes a lift mechanism 620 structured to lift a load-bearing frame 610 supporting the load and a support foot 640 connected to the lift mechanism, the support foot structured to interface with the base surface 605. A roller assembly 630 is also coupled to the lift mechanism 620. A travel mechanism 660 is coupled to the roller assembly 620, and is structured to displace the roller assembly relative to the support foot 640. The load transporting apparatus also includes one or more linking devices 670 coupled to the support foot 640, and one or more biasing devices 680 coupled to the linking devices. The biasing devices 680 are structured to become activated during a load-movement phase when the roller assembly 630 is non-linearly displaced by the travel mechanism 660 relative to the support foot 640, and structured to return the support foot to an aligned position relative to the load-bearing frame 610 during a recovery phase. Here, the support foot 640 may be aligned with the load-bearing frame 610 when a longitudinal centerline of the support foot is parallel with a main beam of the load-bearing frame.

In these embodiments, the linking devices 670 are coupled to the biasing device 680 so that when the roller assembly 630 moves the load in a direction different than the orientation of the support foot 640, a deflection force is generated and/or stored as potential energy in the biasing device 680. This deflection force may be stored by deforming the biasing device 680 within the elastic region of a stress-strain curve associated with a material of the biasing device. For example, in embodiments where the biasing device 680 is a torsional bar, the deflection force transmitted to the biasing device during the non-linear displacement or movement may cause the torsional bar to twist.

The contact between the support foot 640 and the base or ground surface 605 creates substantial frictional forces that prevent the support foot from rotating or moving during the non-linear displacement. During the recovery phase of the walking cycle, the support foot 640 is raised above the base surface 605, which eliminates the frictional forces between the foot and the base surface. Once the support foot 640 begins to lose contact with the base surface 605, the potential energy stored in the biasing device 680 is used to return the support foot to an aligned position relative to the load-bearing frame 610. The alignment of the load-bearing frame 610 is dictated by the movement of the roller assembly 630 by the travel mechanism 660. Hence, when the roller assembly 630 is non-linearly displaced (e.g., moved such as shown in FIG. 5), the orientation of the load-bearing frame 610 becomes skewed from the orientation of the support foot 640. In the above example, where the biasing device 680 is a torsional bar, the support foot 640 is returned to a positioned aligned relative to the load-bearing frame 610 when the support foot loses contact with the base surface 605 and the torsion bar is allowed to "untwist," thereby re-orienting the support foot. In other words, the torsion bar is activated when an angular displacement occurs between the support foot 640 and the load-bearing frame 610, where the activation of the torsion bar including a torquing force being applied to the torsion bar.

Although a torsion bar is discussed as the biasing device 680, may different types of biasing devices may be used in other embodiments, such as leaf springs, coil springs, chains, hydraulic cylinders, motors, or any other type of device that can be deflected and/or store potential energy to apply a realignment force to the support foot 640.

Figure 7A:
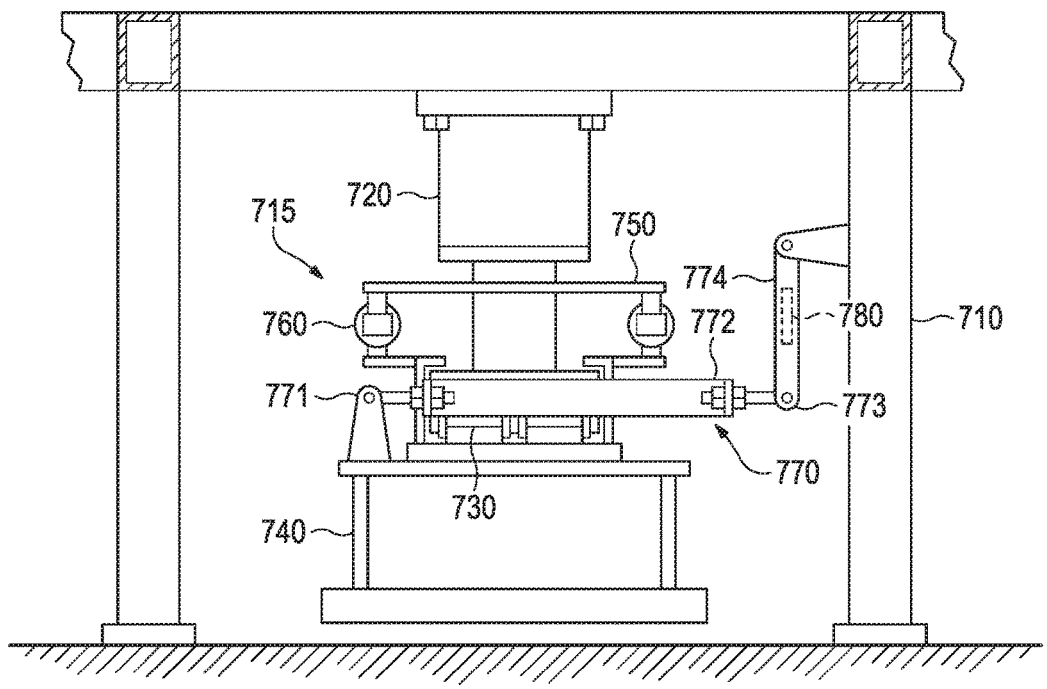
FIG. 7A is a side view of an example walking apparatus in a recovery position according to embodiments of the invention.
Figure 7B:
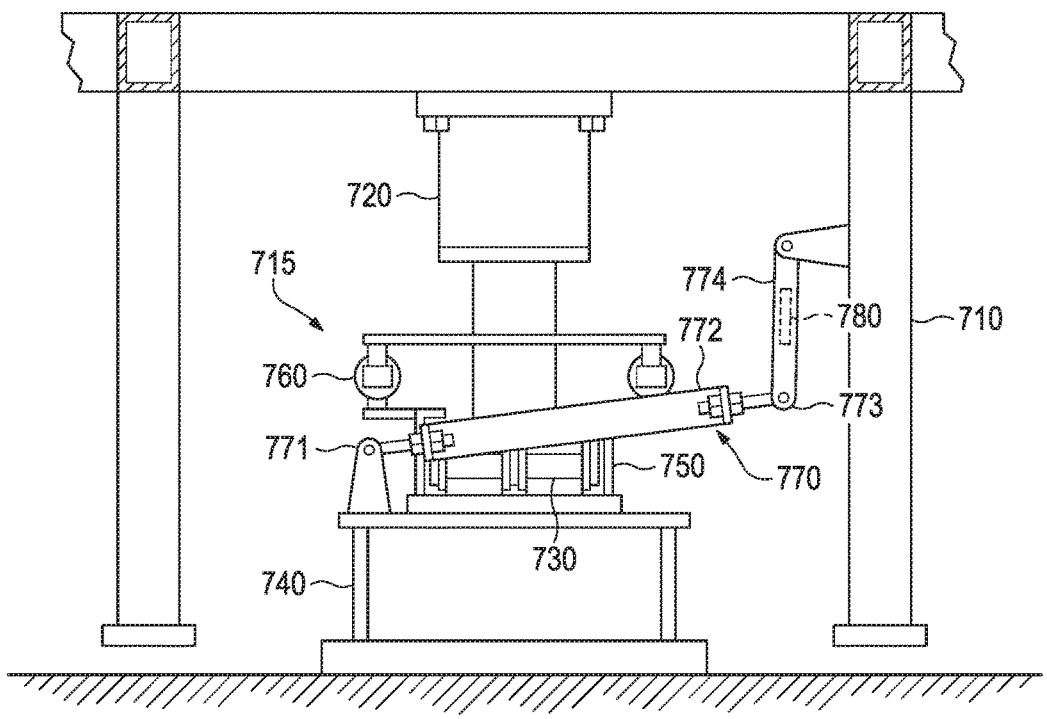
FIG. 7B is a side view of the example walking apparatus shown in FIG. 7A in a load-movement position according to embodiments of the invention.

FIG. 6 is presented in a schematic style view as many possible variations in the appearance and mechanical structure of the load transporting apparatus 615 exist. FIGS. 7A and 7B provide a more detailed view of one embodiment of a load transporting apparatus. FIG. 7A is a side view of an example walking apparatus in a recovery position according to embodiments of the invention. FIG. 7B is a side view of the example walking apparatus shown in FIG. 7A in a load-movement position according to embodiments of the invention. Referring to FIGS. 7A and 7B, a load transporting or walking apparatus 715 includes a lift mechanism 720, a roller assembly 730, a roller track 750, and a support foot 740. The lift mechanism 720 may include a hydraulic jack suspended from a horizontal beam of the load-bearing frame 710. Additional details regarding the structure of the load transporting apparatus 715 can be found in co-pending application Ser. No. 13/711,193, entitled ROTATION DEVICE FOR LOAD TRANSPORTING APPARATUS, the contents of which are herein incorporated by reference in their entirety.

The roller track 750 of the walking apparatus 715 may be coupled to the support foot 740 with a connection mechanism that allows the support foot to rotate relative to the roller track. Various connection mechanisms may be used to facilitate this relative rotation, such as a rotation pin described below in FIG. 9 and in the above mentioned application Ser. No. 13/711,193. In addition, the lift mechanism 720 may be structured to allow the roller assembly 730 to rotate about a substantially vertical axis in the center of a cylinder rod of the lift mechanism. That is, the roller assembly 730 may also be free to rotate around the cylinder rod of the lift mechanism 720.

The walking apparatus 715 may also include a travel mechanism 760 that is connected to the roller track 750 and coupled to the roller assembly 730 such that when the travel mechanism is activated, the roller assembly moves relative to the roller track. In the embodiment shown in FIGS. 7A and 7B, the travel mechanism 760 includes two travel cylinders mounted on the roller track 750 on opposite sides of the roller track. Here, the travel cylinders of the travel mechanism 760 may balance the load being moved by the roller assembly 730 over the roller track 750. In other embodiments, one travel cylinder, or three or more travel cylinders may be used to move the roller assembly 730 relative to the roller track 750. In other embodiments, the travel mechanism 760 may include different movement structures, such as pulleys, levers, winches, tracks, etc.

In the embodiments shown in FIGS. 7A and 7B, the roller assembly 730 may include a plurality of rollers or roller chain that rotate as well as roll on the roller track 750. That is, in some embodiments, the roller assembly 730 may include a WBOT series roller assembly from Hilman Rollers. Due to the configuration of the roller chain 730 of the roller assembly 730 and the tolerance between the roller assembly and the roller track 750 of the walking machine 715, the rollers of the roller chain will typically be engaged with the roller track during operation and use of the walking machine.

The roller assembly 730 may be secured to the lower end of the lift mechanism 720, with the roller assembly being captured within a U-shaped roller track 750. The roller assembly 730 may be configured to roll along the bottom inside surface of the roller track 750 as well as along the underside of the two upper flanges of the roller track. The one or more travel cylinders 760 may be coupled between the lift mechanism 720 and the roller track 750. Accordingly, as will be understood from the more detailed discussion below, these travel cylinders 760 permit for the translation of the roller track 750 relative to the lift mechanism 720 and vice versa. As discussed above, the roller track 750 may be secured to the elongate ground-engaging foot 740 (support foot) via a rotational pin (not shown in FIG. 7, but similar to element 955 of FIG. 9), which enables the roller track to be rotationally positioned relative to the foot for steering of the walking machine 715.

Figure 8A:
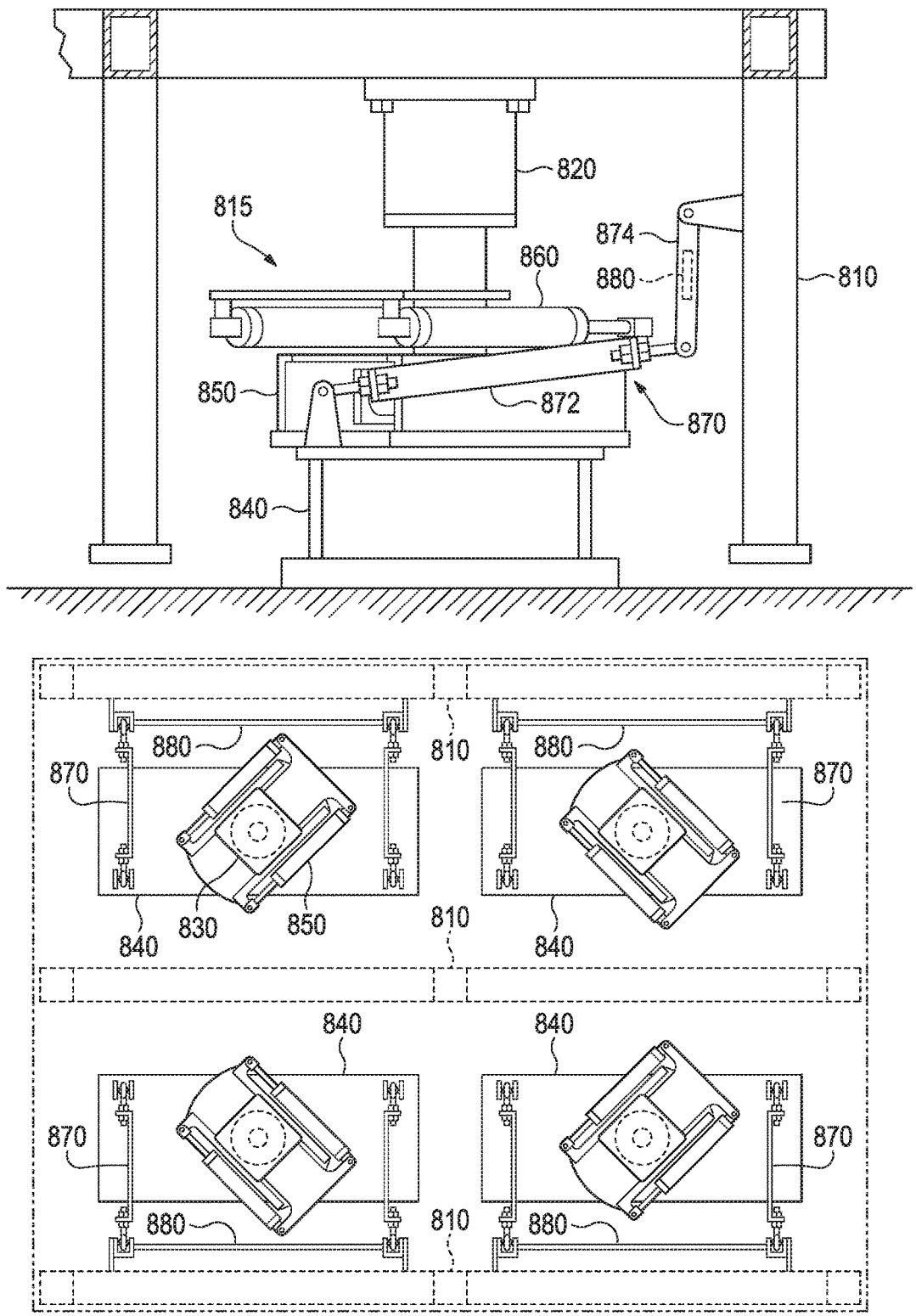
FIGS. 8A, 8B, 8C, and 8D are side and top views of walking apparatuses that illustrate an example operation progression of a load transporting system according to embodiments of the invention.

As shown in FIGS. 7A and 7B, a linking mechanism 770 is coupled to the support foot 740 and a biasing device 780 (shown more clearly as element 880 in FIG. 8A). In some embodiments, the linking mechanism 770 may include a first linking device attached at a first end of the support foot 740, where a second linking device connected to a second end of the support foot opposite of the first end of the first support foot (such as shown in FIGS. 6 and 8A). The biasing device 780 may be coupled between the first and second linking devices of the linking mechanism 770.

In the embodiments shown in FIGS. 7A and 7B, the linking mechanism 770 includes a first linking rod 772 connected to the support foot 740 with a first pivot joint 771. In some embodiments, the first pivot joint 771 may be a spherical rod end bearing configured to allow movement in three degrees of freedom. In other embodiments, the first pivot joint 771 may be another type of joint, such as a hinge joint, that restricts movement to one or two degrees of freedom.

The linking mechanism 770 may also include a second linking rod 774 connected to the first linking rod 772 with a second pivot joint 773. As with the first pivot joint 771, the second pivot joint 773 may be a spherical rod end bearing, or any other type of joint. The second linking rod 774 may further be connected to the load-bearing frame 710. In other embodiments, the one or more biasing devices 780 are also coupled to the load-bearing frame 710.

As shown in FIGS. 7A and 7B, the first and second pivot joints 771, 773 allow linking mechanism 770 to move vertically with the support foot 740 without deflecting or otherwise activating the biasing device 780.

As shown in co-pending application Ser. No. 13/711,315, entitled CENTERING DEVICE FOR LOAD TRANSPORTING APPARATUS, the contents of which is herein incorporated by reference in its entirety, a walking apparatus 715 may also include one or more guide devices positioned adjacent to the roller assembly 730, and one or more biasing devices coupled to the guide devices. Here, the biasing devices may be structured to become deflected during a load-movement phase when the movement of the roller assembly 730 deviates from a set direction of travel, and structured to return the support foot to a centered position relative to the support foot 740 during a recovery phase.

FIGS. 8A, 8B, 8C, and 8D are side and top views of walking apparatuses that illustrate an example operation progression of a load transporting system according to embodiments of the invention. Here, FIGS. 8A-8C may show a load-movement phase of a walking cycle, while FIG. 8D may show a recovery phase of a walking cycle, where the walking apparatus is in a spin steering mode.

Referring to FIG. 8A, a walking apparatus includes a support foot 840 positioned on a base surface 805 and connected to roller track 850. The roller track 850 is structured to allow a roller assembly 830 to move relative to the roller track when activated by a travel mechanism 860. A lift mechanism 820, such as hydraulic jack, is connected between the roller assembly 830 and load-bearing frame 810. A linking device 870 includes a first linking member 872 that is connected to the support foot, and a second linking member 874 that connects the first linking member to the load-bearing frame 810. A biasing device 880 is also connected to the linking device 870, and structured to become deflected or activated during a non-linear movement of the roller assembly 830 relative to the support foot 840. As shown in FIG. 8A, the walking apparatus 815 is in an initial position of a walking cycle in a spin steering mode. The roller tracks 850 of each walking apparatus 815 are oriented in a desired direction of travel. Here, in this first step of making a spin movement, the lift mechanisms 820 are activated to lift the load-bearing frame 810 (and load) above the base surface.

Figure 8B:
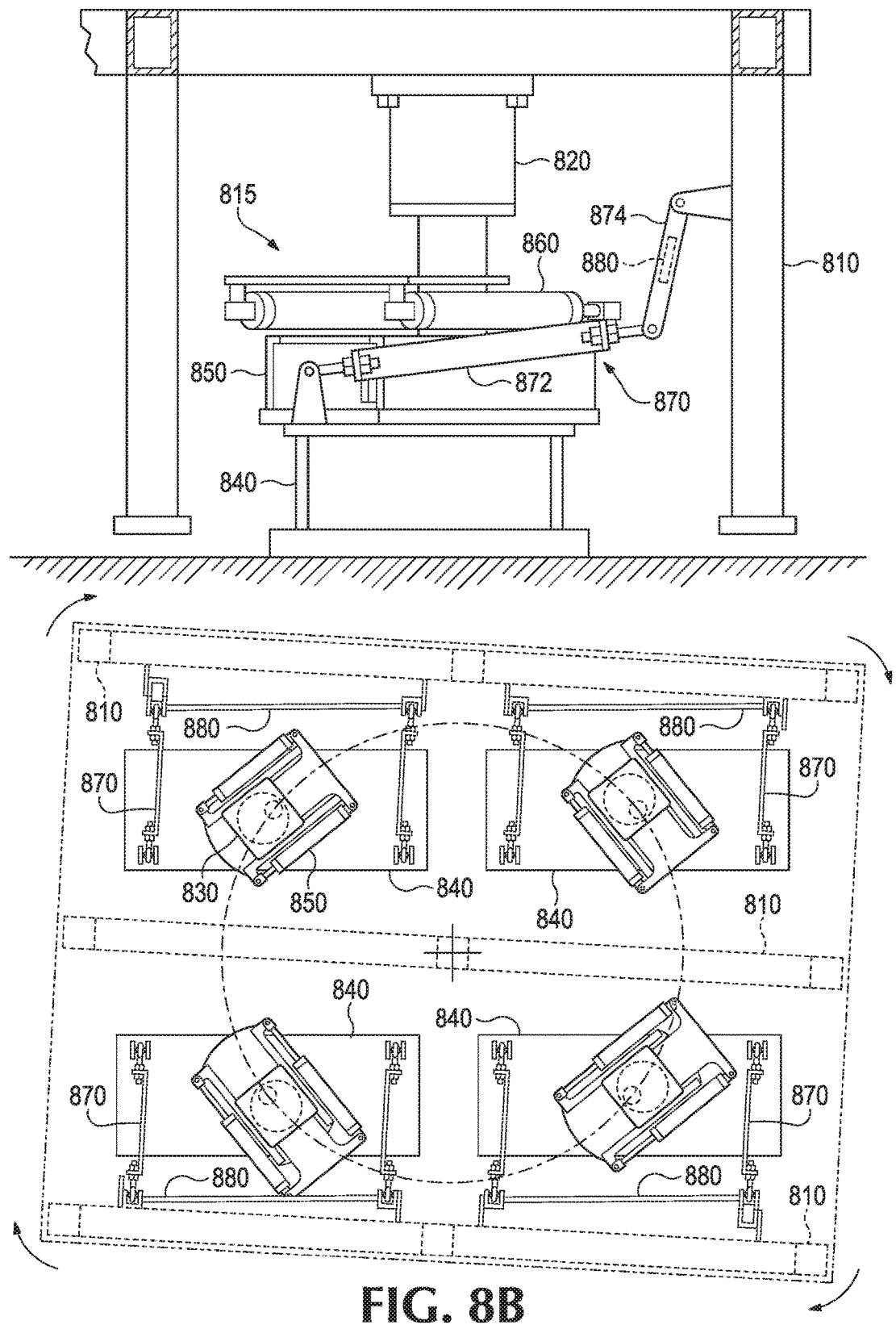

Referring to FIG. 8B, a step in a walking motion of the walking machine is illustrated. Specifically, as indicated by the arrows showing rotation of the load-bearing frame 810, the travel mechanism 860 is activated to displace the roller assembly 830 relative to the roller track 850 as shown. In this second step the walking system is moved in a circular or spin direction. Here, the travel cylinders of the travel mechanism 860 are actuated and the load-bearing frame 810 moves to a new angle. The support feet 840 are on the support surface and an angle of displacement occurs between the load-bearing frame 810 and the support feet. This non-linear movement or angular displacement causes an angular change in the biasing device 880. In embodiments where the biasing device 880 is a torsion bar, the resulting torque on the torsion bar causes the part of the linking device 870 to be in compression and causes another part of the linking device to be in tension.

Figure 8C:
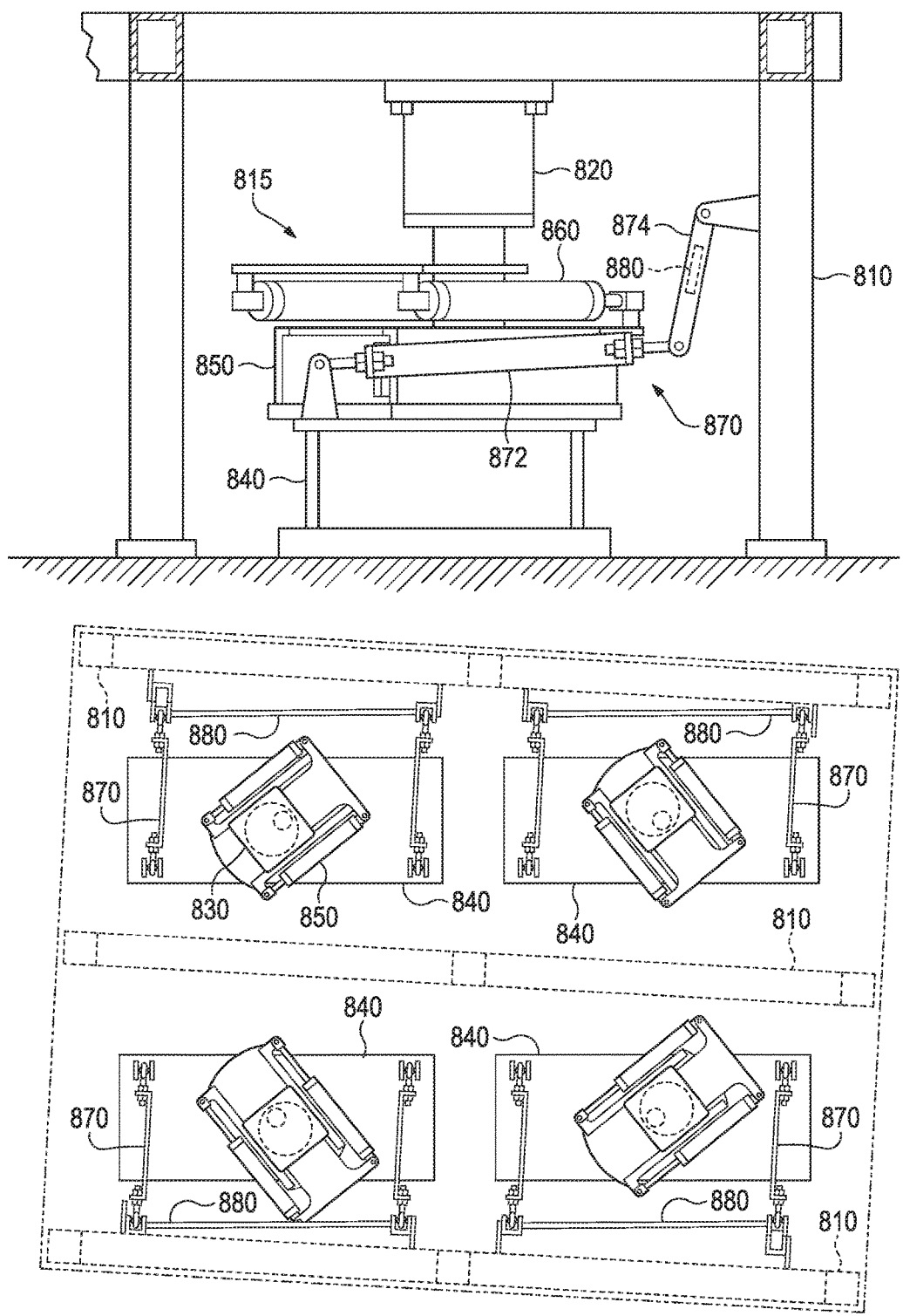

Referring to FIG. 8C, the travel mechanism 860 has finished moving the roller assembly 830 and load-bearing frame 810. Additionally, the lift mechanism 820 has been activated to lower the load and load-bearing frame 810. Here, the load-bearing frame 810 has just contacted the ground surface. However, the support foot 840 is still positioned on the ground surface as well. Hence, the biasing devices 880 are still in a deflected, activated, or biased state.

Figure 8D:
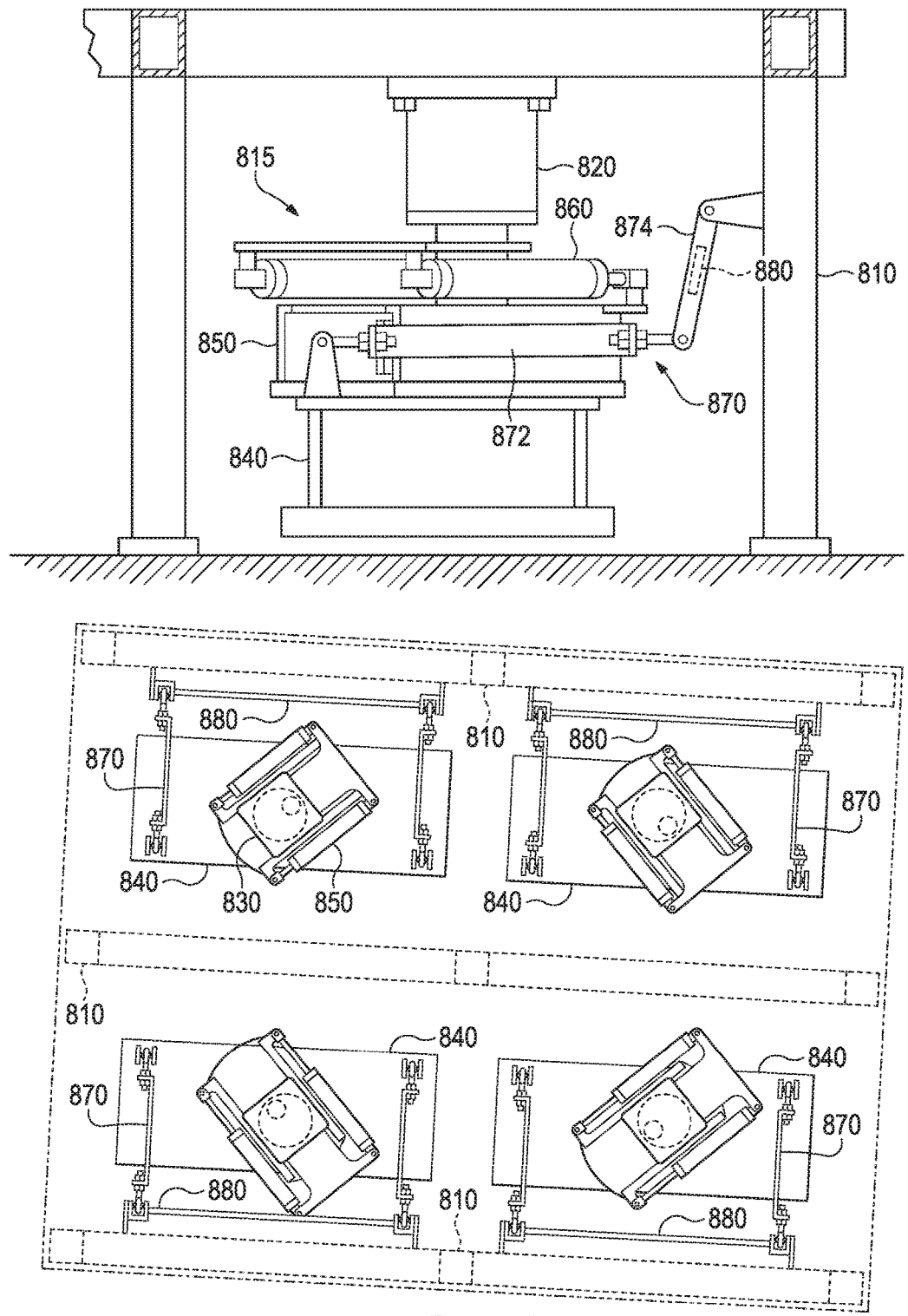

Referring to FIG. 8D, the lift mechanism 820 is continued to be operated such that the support foot 840 loses contact with the ground surface. As soon as this connection between the support foot 840 and the ground surface disappears, the biasing device 880 causes the support foot to "snap" back into alignment with the load-bearing frame 810 as shown.

Figure 9A:
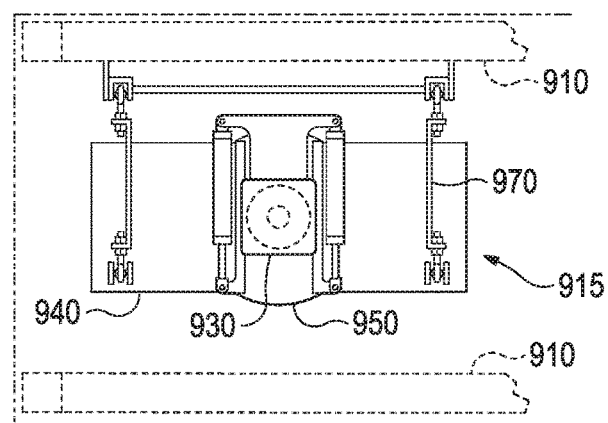
FIG. 9A is a top view of a walking apparatus in a perpendicular orientation according to embodiments of the invention.
Figure 9B:
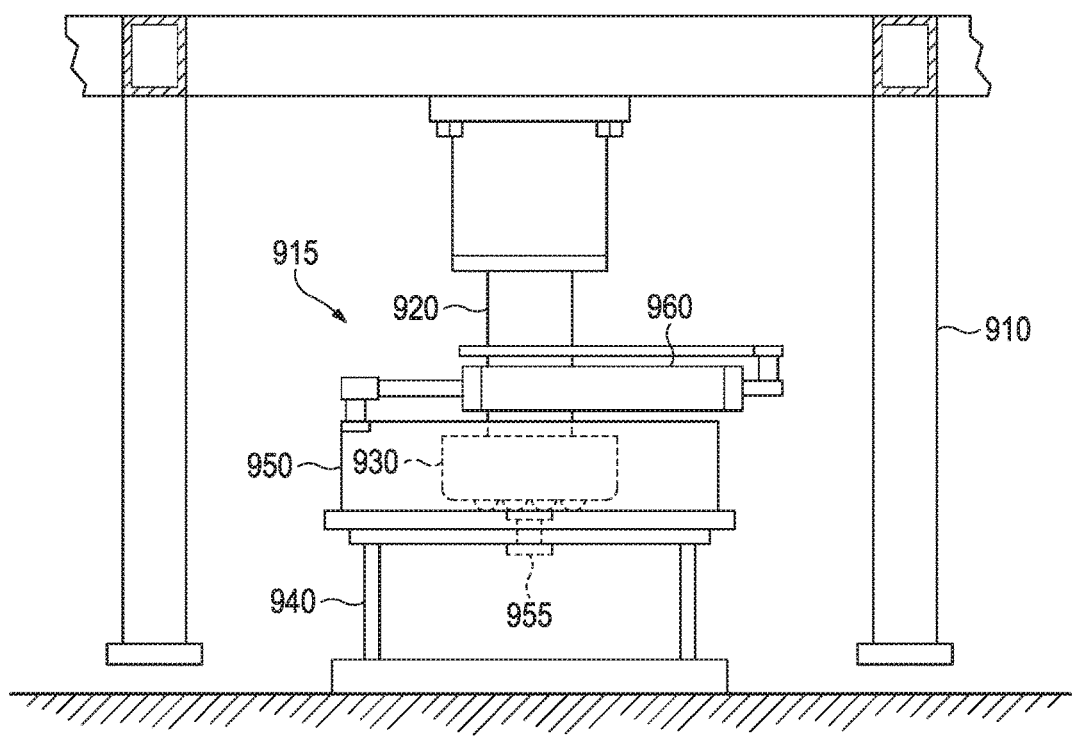
FIG. 9B is a side view of the walking apparatus shown in FIG. 9A in a load-movement position according to embodiments of the invention.
Figure 9C:
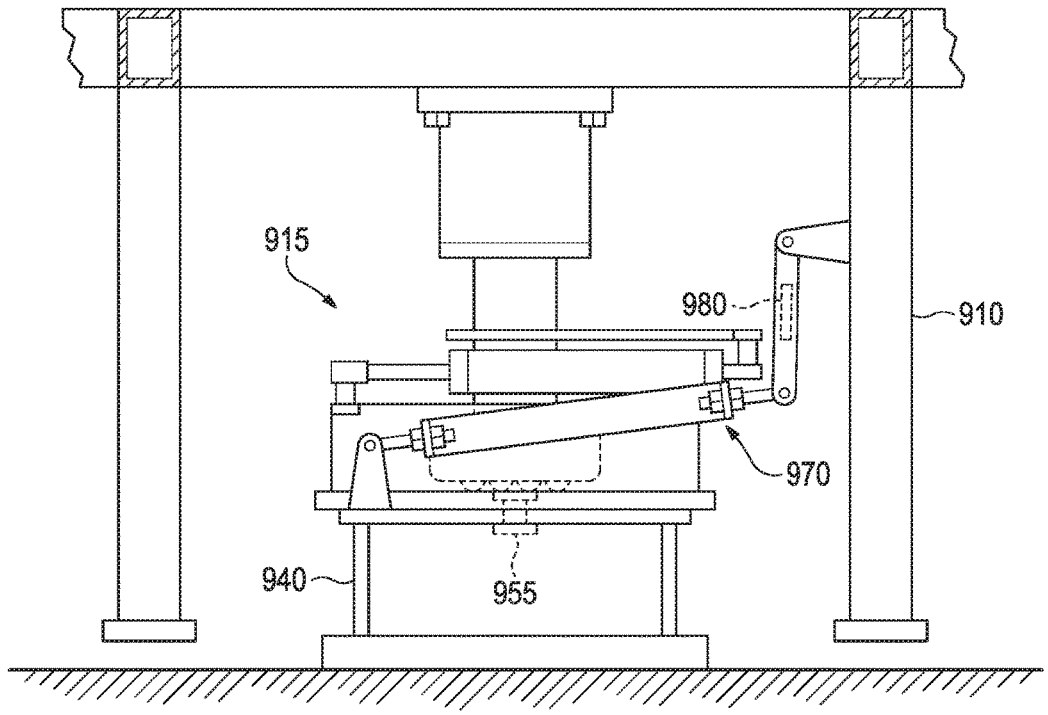
FIG. 9C is a side view of the walking apparatus shown in FIG. 9A in a recovery position according to embodiments of the invention.

FIGS. 9A-9C illustrate another embodiment of a walking apparatus. Here, FIG. 9A is a top view of a walking apparatus in a perpendicular orientation according to embodiments of the invention. FIG. 9B is a side view of the walking apparatus shown in FIG. 9A in a load-movement position where the linking devices have been removed for clarity sake. FIG. 9C is a side view of the walking apparatus shown in FIG. 9A in a recovery position with the linking devices added back in for reference purposes.

Referring to FIGS. 9A-9C, a walking apparatus 915 includes a lift mechanism 920 coupled to a load-bearing frame 910 that supports a load to be moved. The lift mechanism 920 is connected to a roller assembly 930 that is positioned on a roller track 950. The roller assembly 930 is moved relative to the roller track 950 with one or more travel mechanisms 960. The roller track 950 is coupled to a support foot 940 with a rotation pin 955, such as a king pin or other connection means that allows rotation of the roller track relative to the support foot as described in the rotation device application Ser. No. 13/711,193 cited above. A linking device 970 is coupled between the support foot 940 and the load-bearing frame 910. A biasing device 980 is connected to the linking device 970. As described above, the biasing device 980 becomes deflected or activated when the roller assembly 930 moves in a non-linear direction relative to the support foot 940. For example, the roller track 950 is oriented perpendicular to the orientation of the support foot 940 in FIG. 9A. As the roller assembly 930 moves in the direction of the orientation of the roller track 950, the roller assembly and the load-bearing frame will also move substantially perpendicularly to the orientation of the support foot 940.

Here, the movement of the roller assembly 930 in this orientation does not activate or deflect the biasing device 980 because the linking devices 970 include joints that allow for the free movement of the roller assembly. The linking devices 970 may be structured in this manner because the orientation of the support foot 940 relative to the load-bearing frame 910 does not change.

Figure 10:
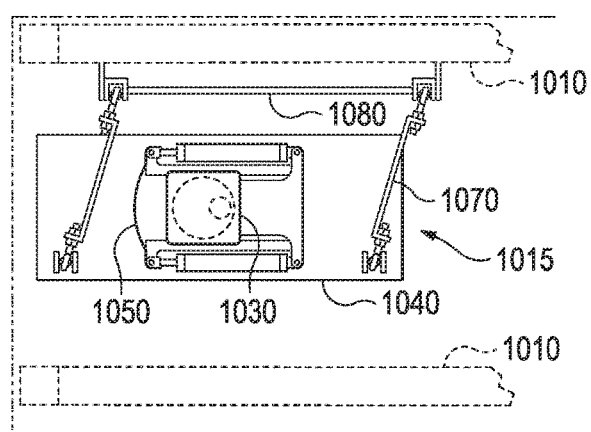
FIG. 10 is a top view of a walking apparatus after a load-movement phase of a walking cycle completed in a parallel direction according to embodiments of the invention.

This can also be seen when the roller assembly is moved parallel to the orientation direction of the support foot, as shown in FIG. 10. Referring to FIG. 10, a walking apparatus 1015 has just completed a load-movement phase of a walking cycle where a roller track 1050 is oriented in the same direction as a support foot 1040. Here, the roller assembly 1030 was moved to the right, along with the load-bearing frame 1010, as shown. The joints of the linking device 1070, however, allow the linking device to be angled from the linear movement without deflecting or otherwise activating the biasing device 1080. During a recovery phase, the load-bearing frame 1010 is lowered and the support foot 1040 is raised above a base surface. The support foot 1040 can then be repositioned relative to the roller assembly 1030 by activation of the transport mechanism 960 (FIG. 9B).

Some of the embodiments discussed above rely on the load-bearing frame as a reference point to realign the support feet during non-linear movements of the load. However, in other embodiments, other linking and biasing devices can be utilized to maintain alignment of the support feet. Some of these techniques are discussed below with respect to FIGS. 11 and 12A-12E.

Figure 11:
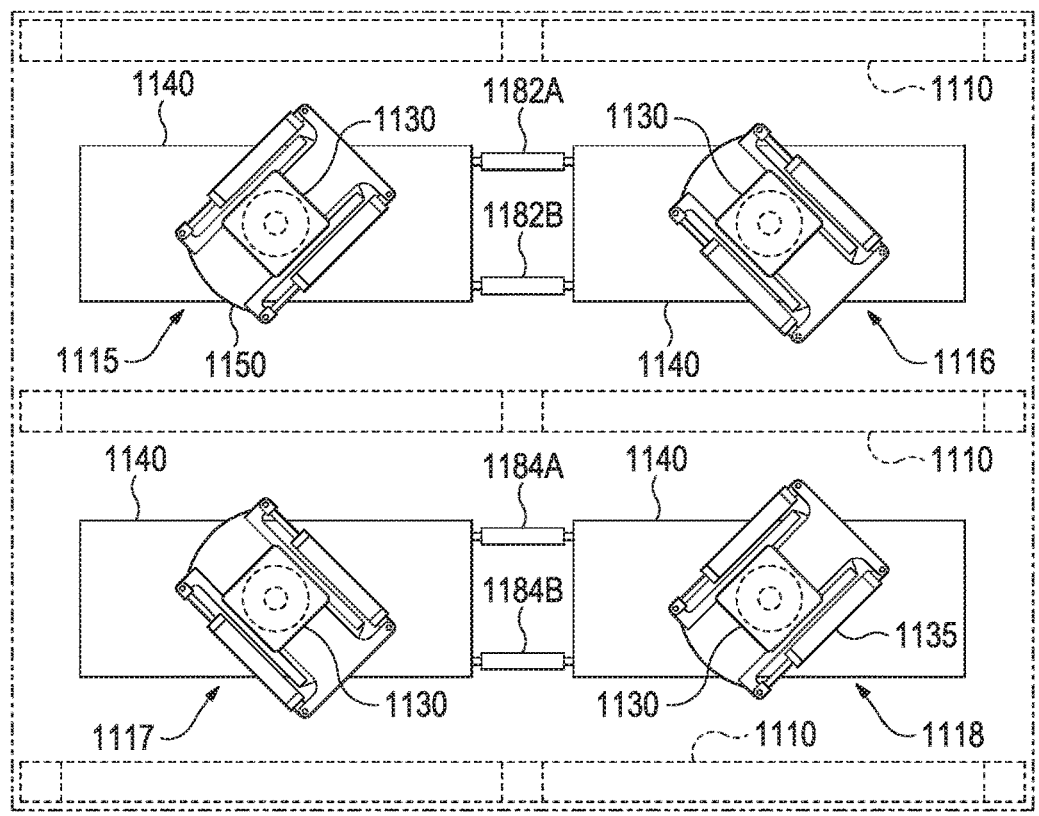
FIG. 11 is a top view of a load movement system according to embodiments of the invention.

FIG. 11 is a top view of a load movement system according to embodiments of the invention. Referring to FIG. 11, multiple load transporting apparatuses 1115, 1116, 1117, 1118 are used to move a load supported by a load-bearing frame 1110. Each of these load transporting apparatuses 1115, 1116, 1117, 1118 include a roller track 1150, a roller assembly 1130 that moves relative to the roller track, and a support foot 1140. Here, load transporting apparatuses that are in orientation-rows are connected with one or more biasing devices 1182, 1184. In particular, the support foot 1140 of a first load transporting apparatus 1115 is connected to the support foot of a second load transporting apparatus 1116 with two biasing devices 1182A and 1182B. These biasing devices 1182A, 1182B ensure that the first and second load transporting apparatuses 1115, 1116 are maintained in alignment with one another and the load-bearing frame 1110.

Here, the linking devices include a first linking device 1182A coupled between a first side of a first end of the first support foot 1140 and a first side of a first end of the second support foot 1140, and a second linking device 1182B coupled between a second side of the first end of the first support foot and a second side of the first end of the second support foot. The placement of the first and second linking devices 1182A, 1182B may ensure that the support feet 1140 are aligned together during a non-linear movement.

Similarly, the support foot 1140 of a third load transporting apparatus 1117 is connected to the support foot of a fourth load transporting apparatus 1118 with two biasing devices 1184A and 1184B. These biasing devices 1184A, 1184B ensure that the third and fourth load transporting apparatuses 1117, 1118 are maintained in alignment with one another and the load-bearing frame 1110.

Although FIG. 11 illustrates one example embodiment of biasing device connections that can maintain alignment of a support foot relative to a load-bearing frame, many different configuration variations exist. FIGS. 12A, 12B, 12C, 12D, and 12E are diagrams of walking apparatuses with various alignment restoration devices that illustrate some of these variations according to embodiments of the invention.

Referring to FIG. 12A, a linking device 1271 is connected between a first support foot 1240 of a first load transporting apparatus 1215 and a second support foot 1241 of a second load transporting apparatus 1216. The linking device 1271 may be attached to the first support foot 1240 with a first joint 1291, and may be attached to the second support foot 1241 with a second joint 1292. In some embodiments, the first and second joints 1291, 1292 may be ball joints that allow rotational movement. The linking device 1271 may be rigid rod, or may include a section of chain.

Referring to FIG. 12B, a linking device 1272 is connected between a first support foot 1240 of a first load transporting apparatus 1215 and a second support foot 1241 of a second load transporting apparatus 1216. The linking device 1272 may be rigidly attached to the first support foot 1240, but may be attached to the second support foot 1241 with a first biasing device 1281 and a second biasing device 1282. The first and second biasing devices 1281, 1282 may be placed on opposite sides of the linking device 1272 to provide a balanced system to return the support feet 1240, 1241 to uniform alignment after a non-linear movement.

Referring to FIG. 12C, a first biasing device 1283 and a second biasing device 1284 are connected between a first support foot 1240 of a first load transporting apparatus 1215 and a second support foot 1241 of a second load transporting apparatus 1216. This embodiment may be similar to the shown in FIG. 11, except that the first and second biasing devices 1283, 1284 are specified as spring devices.

Referring to FIG. 12D, the support foot 1240 of a load transporting apparatus 1215 is connected to a load-bearing frame 1210 via a first linking cylinder 1273 and a second linking cylinder 1274. The first and second linking cylinders 1273, 1274 may be hydraulic cylinders that are activated during a recovery phase of a walking cycle to return the support foot 1240 to alignment with the load-bearing frame 1210. Alternatively, the first and second linking cylinders 1273, 1274 may be spring cylinders that automatically return the support foot 1240 to alignment with the load-bearing frame 1210 during a recovery phase of a walking cycle without additional operator input.

Referring to FIG. 12E, a support foot 1240 of a load transporting apparatus 1215 is connected at each corner to a biasing device 1285, 1286, 1287, 1288. These biasing devices 1285, 1286, 1287, 1288 may ensure that the support foot 1240 is maintained in alignment with a load-bearing frame during the recovery phase of a walking cycle by releasing potential energy stored during compression and/or elongation during non-linear movements.

Figure 13:
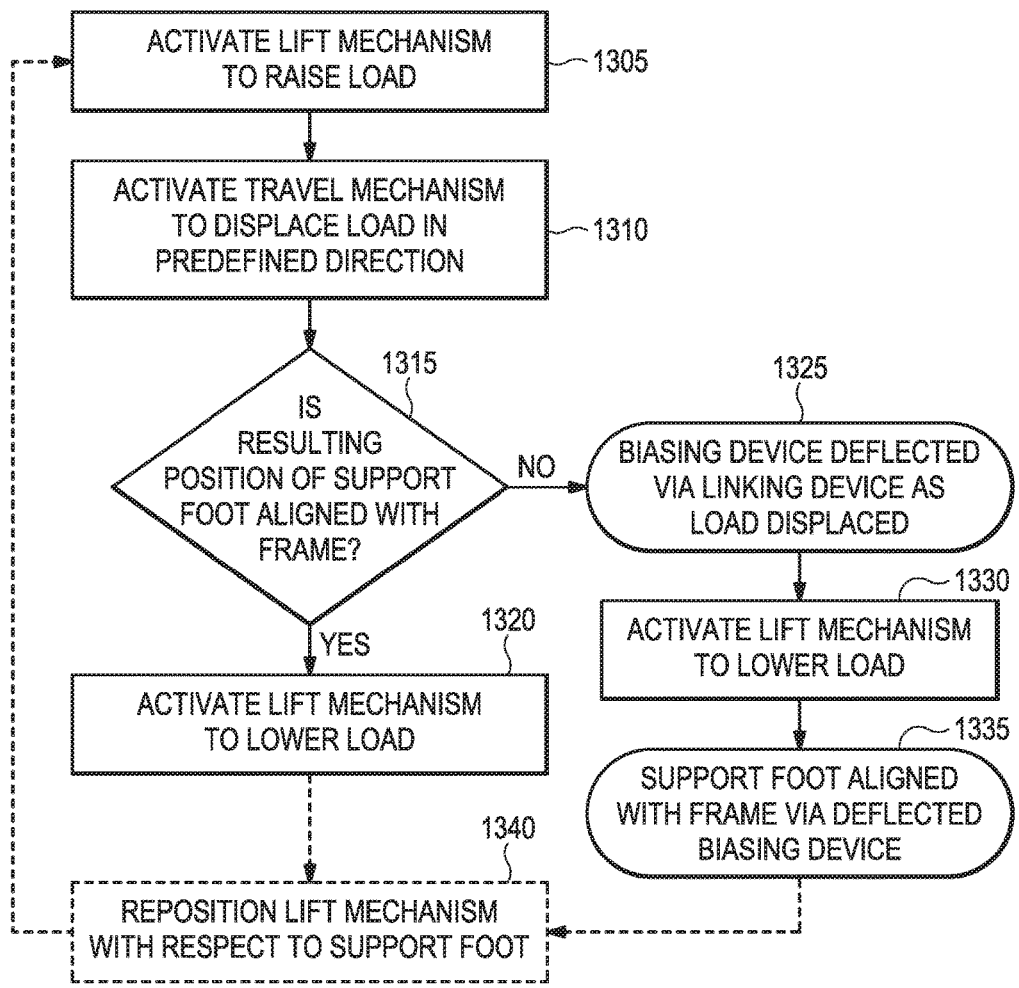
FIG. 13 is a flow diagram illustrating method of operating a load transporting apparatus according to embodiments of the invention.

FIG. 13 is a flow diagram illustrating method of operating a load transporting apparatus according to embodiments of the invention. In particular, the flow diagram of FIG. 13 illustrates a method of aligning a support foot of a load transporting device relative to a load-bearing frame during a load-transporting movement. The load transporting device includes a roller assembly coupled to a lift mechanism, a travel mechanism structured to displace the roller assembly relative to the support foot, one or more linking devices coupled to the support foot, and one or more biasing devices coupled to the linking devices.

Referring to FIG. 13, a flow begins at process 1305 where the lift mechanism is activated to lower the support foot to a ground surface and raising a load supported by the load-bearing frame. In process 1310, the travel mechanism is activated to displace the roller assembly connected to the lift mechanism relative to the support foot and ground surface, thereby moving a position of the load. Depending on the movement of the travel mechanism relative to the support foot, the position of the support foot may be aligned with the load-bearing frame or may not be aligned with the load-bearing frame. As discussed above, when the load is moved in a direction perpendicular to the orientation of the support foot, or moved parallel to the orientation of the support foot, the support foot typically remains aligned with the load-bearing-frame. If the load is moved in a different direction relative to the support foot, such as when the load is being steered in a non-linear path, the support foot can become misaligned with the load-bearing frame. In process 1315, it is observed whether the resulting position of the support foot is aligned with the load-bearing frame.

When the support foot remains aligned with the load-bearing frame, the flow proceeds to process 1320 where the lift mechanism is activated to lower the load and raise the support foot. However, when the support foot is not aligned with load-bearing frame, the biasing device is deflected via the linking device as the load is displaced as shown in step 1325. That is, the biasing devices are deflected when movement of the roller assembly results in an angular displacement between a centerline of the support foot and an orientation of the load-bearing frame. In process 1330, the lift mechanism is activated to lower the load and raise the support foot from the ground surface. As the support foot loses contact with the ground surface, the deflected biasing device acts on the support foot to align the support foot with the load-bearing frame, as shown in step 1335. That is, the centerline of the support foot is automatically aligned relative to the orientation of the load-bearing frame. After step 1335 or process 1320, the flow may include optional process 1340 where the lift mechanism is repositioned with respect to the support foot. If further walking steps are needed to move the load to a final position, the flow may return to process 1305 to initiate another walking cycle.

As described above, some embodiments of this invention are directed to a load transporting apparatus configured to move a load over a ground surface in one or more incremental steps each including a load-movement phase and a recovery phase. To move the load, the load transporting apparatus is coupled to a load-bearing frame configured to support the load. The load transporting apparatus includes a first support foot structured to interface with the ground surface, the first support foot having a length, width, and longitudinal centerline bisecting the width of the first support foot. The load transporting apparatus also includes a second support foot structured to interface with the ground surface, the second support foot also having a length, width, and longitudinal centerline bisecting the width of the second support foot.

First and second roller tracks are respectively coupled to the first support foot and second support foot via a first king pin connector and a second king pin connector. Additionally, first and second roller assemblies are respectively positioned on the first and second roller tracks. Each roller assembly includes a roller frame and one or more rollers set in the roller frame. First and second lift mechanisms are respectively coupled to the first and second roller assemblies. Each of the first and second lift mechanisms includes a lift cylinder connected to the load-bearing frame, and a cylinder rod, where each of the first and second lift mechanisms are structured to lift the load-bearing frame at the start of the load-movement phase.

The load transporting apparatus also includes first and second travel mechanisms respectively coupled to the first and second roller assemblies. Each of the travel mechanisms are structured to move the respective roller assembly relative to the respective support foot during the load-movement phase. A first linking device coupled to the first support foot, and a second linking device coupled to the second foot. A first biasing device is connected to the first linking device, where the first biasing device is structured to become activated during a load-movement phase when the first roller assembly is non-linearly displaced by the first travel mechanism relative to the first support foot, and structured to return the first support foot to an aligned position relative to the load-bearing frame during a recovery phase. A second biasing device is connected to the second linking device, where the second biasing device is structured to become activated during a load-movement phase when the second roller assembly is non-linearly displaced by the second travel mechanism relative to the second support foot, and structured to return the second support foot to an aligned position relative to the load-bearing frame during a recovery phase.

In some embodiments, the first linking device is coupled between the first support foot and the second support foot. In these embodiments, the second linking device is also coupled between the first support foot and the second support foot, as shown in FIG. 11, for example. In other embodiments, the first and second biasing devices are respectively coupled to the load-bearing frame, such as in FIG. 7A, for example.

Figure 14:
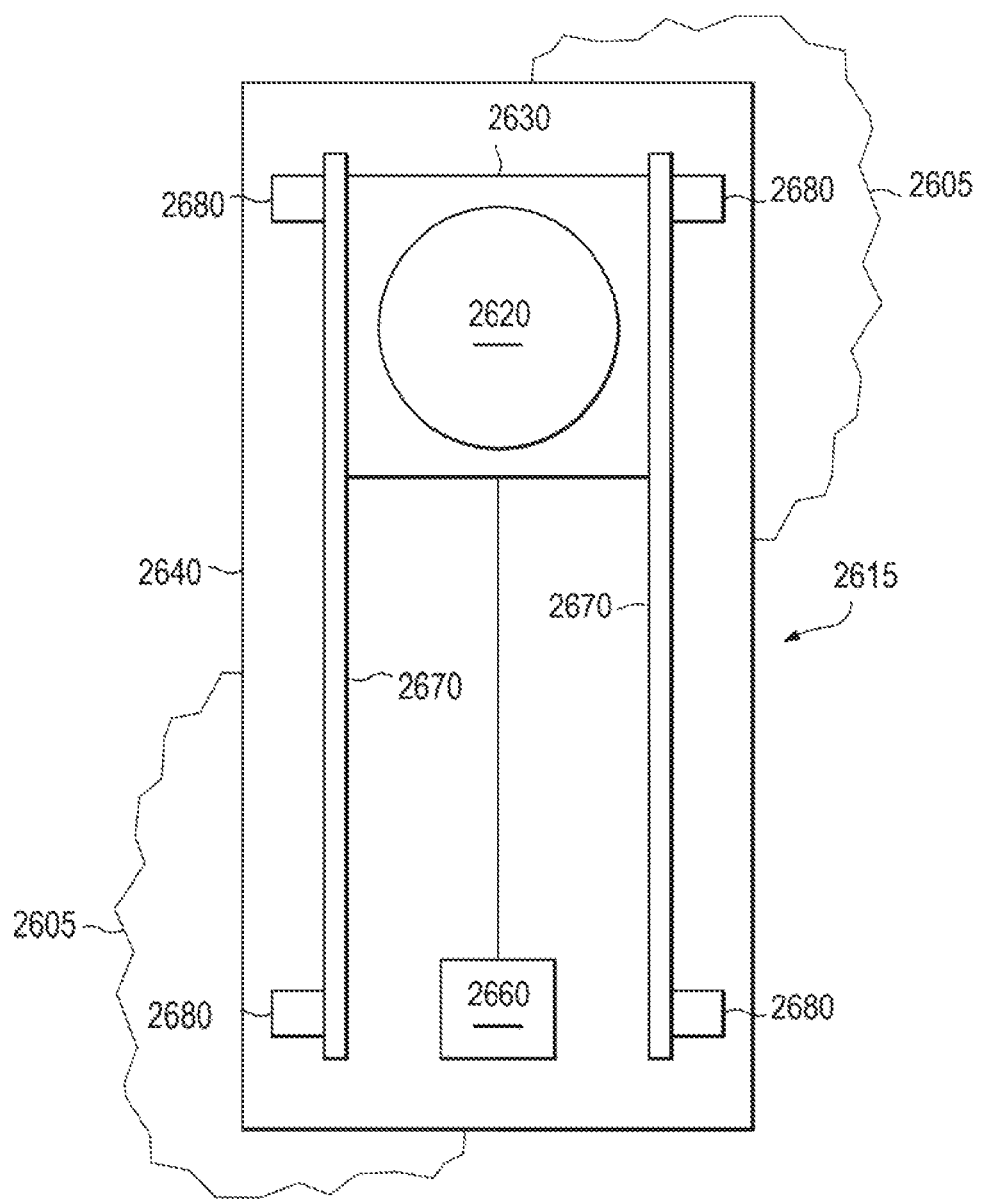
FIG. 14 is a schematic diagram of a top view of a walking apparatus according to embodiments of the invention.

FIG. 14 is a schematic diagram of a top view of a walking apparatus according to embodiments of the invention. Referring to FIG. 14, a load transporting apparatus 2615 is configured to move a load (e.g., element 100 FIG. 1) over a base surface 2605 in one or more incremental steps each including a load-movement phase and a recovery phase. The load transporting apparatus 2615 includes a lift mechanism 2620 structured to lift a load-bearing frame supporting the load and a support foot 2640 connected to the lift mechanism, the support foot structured to interface with the base surface 2605. A roller assembly 2630 is also coupled to the lift mechanism 2620. A travel mechanism 2660 is coupled to the roller assembly 2620, and is structured to displace the roller assembly relative to the support foot 2640. The load transporting apparatus also includes one or more guide devices 2670 positioned adjacent to the roller assembly 2630 and configured to guide the roller assembly during movement caused by the travel mechanism 2660. One or more biasing devices 2680 are coupled to the guide devices 2670, where the biasing devices are structured to become activated during a load-movement phase when the roller assembly 2630 is non-linearly displaced by the travel mechanism 2660 relative to a set direction of travel. The biasing devices 2680 are further structured to return the support foot 2640 to a centered position relative to the roller assembly 2630 about the longitudinal center line of the support foot during a recovery phase.

In some embodiments, the biasing devices 2680 are temporarily or permanently fixed to the support foot 2640. The orientation of the support foot 2640 in these embodiments may determine the set direction of travel. That is, the support foot 2640 may be positioned or set in a desired direction of travel prior to the start of a walking cycle. Here, the guide devices 2670 may be coupled to the biasing devices 2680, and be moveable with respect to the support foot 2640. Hence, as the roller assembly 2630 is displaced by the travel mechanism 2660, one or more of the guide devices may be displaced relative to the support foot 2640 by pressing or pulling against one or more of the biasing devices 2680. In other embodiments, the guide devices 2670 are temporarily or permanently fixed to the support foot 2640. Here, the biasing devices may be coupled to the roller assembly 2630 and move with roller assembly as it is displaced by the travel mechanism 2660. Hence, if the roller assembly 2630 is moved in a non-linear direction with respect to a centerline of the support foot 2640 or the guide devices 2670, the biasing devices 2680 may become compressed or extended to allow this displacement.

In some embodiments, the one or more guide devices 2670 include guide bars positioned on opposite sides of the roller assembly 2630. The guide bars of the guide devices 2670 may be structured to be substantially parallel with the longitudinal center line of the support foot 2640. Here, the roller assembly 2630 deflects at least one of the guide bars 2670 when movement of the roller assembly by the travel mechanism 2660 deviates from the longitudinal centerline of the support foot 2640. That is, the roller assembly 2630 deflects at least one of the guide bars 2670 when the load is displaced in a non-linear movement, such as a spin motion. When the load transporting apparatus 2615 is placed in a spin motion, the lift cylinder 2620 must move in a circular path as the roller assembly 2630 is aligned in a straight path between guide bars 2670. Hence, there is a relative motion between the lift cylinder 2620 and the centerline of the support foot 2640.

As shown in co-pending application Ser. No. 13/711,193, entitled ROTATION DEVICE FOR LOAD TRANSPORTING APPARATUS, the contents of which are incorporated herein in their entirety, the load transporting apparatus 2615 may further include a roller track (see e.g., element 650 in FIG. 6A of the above co-pending application), where the support foot 2640 is directly coupled to the roller track. Here, the roller track (650) may be coupled to the support foot with a rotation pin (655, FIG. 6A of the above co-pending application), such as a king pin connection device. In embodiments having these features, the rotation pin (655) may allow the roller track (650) to rotate with respect to the support foot 640. Hence, the roller track (650) may be oriented or set in a desired direction of travel even when the support foot 2640 is oriented in a different direction. The roller assembly 2630 may be positioned on the roller track (650) and displaced relative to the roller track.

Here, the biasing devices 2680 may be connected to the roller track (650) rather than the support foot 2640. In some embodiments, the guide device 2670 includes two guide bars positioned on opposite sides of the roller assembly 2630 and oriented substantially parallel to the longitudinal center line of the roller track (650), which determines the set direction of travel. In these embodiments, the roller assembly 2630 deflects at least one of the guide bars 2670 when movement of the roller assembly by the travel mechanism 2660 deviates from the longitudinal centerline of the roller track 2650 (i.e., deviates from the set direction of travel).

In these and other embodiments, the biasing devices 2680 may include spring devices respectively coupling the guide devices 2670 to the support foot 2640. These spring devices may include one or more of leaf springs, coil springs, torsion springs, air springs, or any other type of device that includes an elastic property. In other embodiments, the biasing devices 2680 may include hydraulic cylinders with accumulators.

FIG. 14 is presented in a schematic style view as many possible variations in the appearance and mechanical structure of the load transporting apparatus 2615 exist. FIG. 15 provides a more detailed view of one embodiment of a load transporting apparatus. FIG. 15 is a perspective view of an example walking apparatus according to embodiments of the invention Referring to FIG. 15, a load transporting or walking apparatus 2715 includes a lift mechanism 2720, a roller assembly 2730, and a support foot 2740. The lift mechanism 2720 may include a hydraulic jack suspended from a horizontal beam of the load-bearing frame 310 (FIGS. 3A and 3B).

The lift mechanism 2720 may include a lift cylinder 2720 that is connected to a load-bearing frame 2710, and a cylinder rod 2722 coupled to the roller assembly 2730. Here, the cylinder rod 2722 may be structured to allow the roller assembly 2730 to rotate about a substantially vertical axis in the center of the cylinder rod. That is, the roller assembly 2730 may be free to rotate around the cylinder rod 2722. The connection between the roller assembly 2730 and the cylinder rod may be a bearing or one of a number of different connection variations. In one embodiment, the cylinder rod 2722 may include a groove (not shown) around side edges of a lower portion of the cylinder rod, where the groove corresponds to a retainer cuff (not shown) of the roller assembly 2730. In this example the retainer cuff is rotatable around the groove, but may easily be assembled or disassembled during installation, break-down, or transportation of the walking apparatus 2715.

Although the embodiment shown in FIG. 15 shows the lift cylinder 2721 connected to the load bearing frame 2710 and the cylinder rod 2722 connected to the roller apparatus 2730, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 2715 may also include a travel mechanism 2760 that is connected to the support foot 2740 and coupled to the roller assembly 2730 such that when the travel mechanism is activated, the roller assembly moves relative to the support foot. In some embodiments, the travel mechanism 2760 is attached to the support foot with a pin connection 2762 and pivot rod 2765 to allow the travel mechanism 2760 to rotate relative to the support foot. The travel mechanism 2760 may also be coupled to the roller assembly 2730 with a pin connection to allow the roller assembly to pivot relative to the travel mechanism.

Although the travel mechanism 2760 is shown as a single cylinder in FIG. 15, the travel mechanism may include two or more travel cylinders in other embodiments. In other embodiments, the travel mechanism 2760 may include different movement structures, such as pulleys, levers, winches, tracks, etc.

In the embodiments shown in FIG. 15, the roller assembly 2730 may include a plurality of rollers or roller chain that rotate as well as roll on the roller track 2750. That is, in some embodiments, the roller assembly 2730 may include a WBOT series roller assembly from Hilman Rollers. Due to the configuration of the roller chain of the roller assembly 2730 and the tolerance between the roller assembly and the support foot 2740 of the walking machine 2715, the rollers of the roller chain will typically be engaged with the support foot 2740 during operation and use of the walking machine.

The roller assembly 2730 may be secured to the lower end of the lift mechanism 2720, with the roller assembly being captured within a U-shaped track created in part by the guide devices 2770. The roller assembly 2730 may be configured to roll along the bottom inside surface of the support foot 2740 as well as along the underside of two upper flanges (not shown for clarity purposes) that hold the roller assembly and support foot 2740 when the walking apparatus 2715 is raised above the ground surface 2705 by the lift mechanism 2720 during the recovery phase of a walking cycle. As will be understood from the more detailed discussion below, the travel mechanism 2760 permits for the translation of the support foot 2740 relative to the lift mechanism 2720 and vice versa.

As shown in FIG. 15, guide devices 2770 are positioned on either side of the roller apparatus and extend along a travel path of the roller assembly in a direction substantially parallel to the direction of travel. The guide devices 2770 may include stops on either end to help restrict the movement of the roller assembly 2730. In addition, the guide devices 2770 may include outward-facing tabs to interface with biasing devices 2780. In this illustrated embodiment, the biasing devices 2780 are leaf springs that are attached to spring stops 2785 at either end of the leaf springs. The spring stops 2785 are further fixed to the support foot 2740 to provide fixed points of reference for the leaf springs 2780. In operation, which is discussed in additional detail below with reference to FIGS. 16A-16D, the leaf springs 2780 are deflected outward when the roller assembly 730 pushes against and shifts the guide devices 2770. The leaf springs 2780 may include steel, plastic, or any other type of material that can deflect without permanently damaging the material (i.e., without reaching a plastic region of the material's stress-strain curve).

As discussed above, in other embodiments a roller track (750) may be included in the walking apparatus 2815 and positioned between the roller assembly 2830 and the support foot 2840. For ease of understanding in FIG. 15 (and FIGS. 16A-16D below) this other embodiment can be easily visualized by replacing the references to support foot for element 2840 with references to a roller track. Hence, this embodiment would simply use element 2840 as the roller track and an additional element in a support foot under the roller track as shown in, for example, FIG. 6A of co-pending application Ser. No. 13/711,193 entitled ROTATION DEVICE FOR LOAD TRANSPORTING APPARATUS. Here, as discussed above, the roller track may be secured to the elongate ground-engaging foot 640 (support foot) via a rotational pin (655), which enables the roller track to be rotationally positioned relative to the foot for steering of the walking machine 615.

FIGS. 16A, 16B, 16C, and 16D are diagrams illustrating an example operation progression of the walking apparatus shown in FIG. 15 according to embodiments of the invention.

Figure 16A:
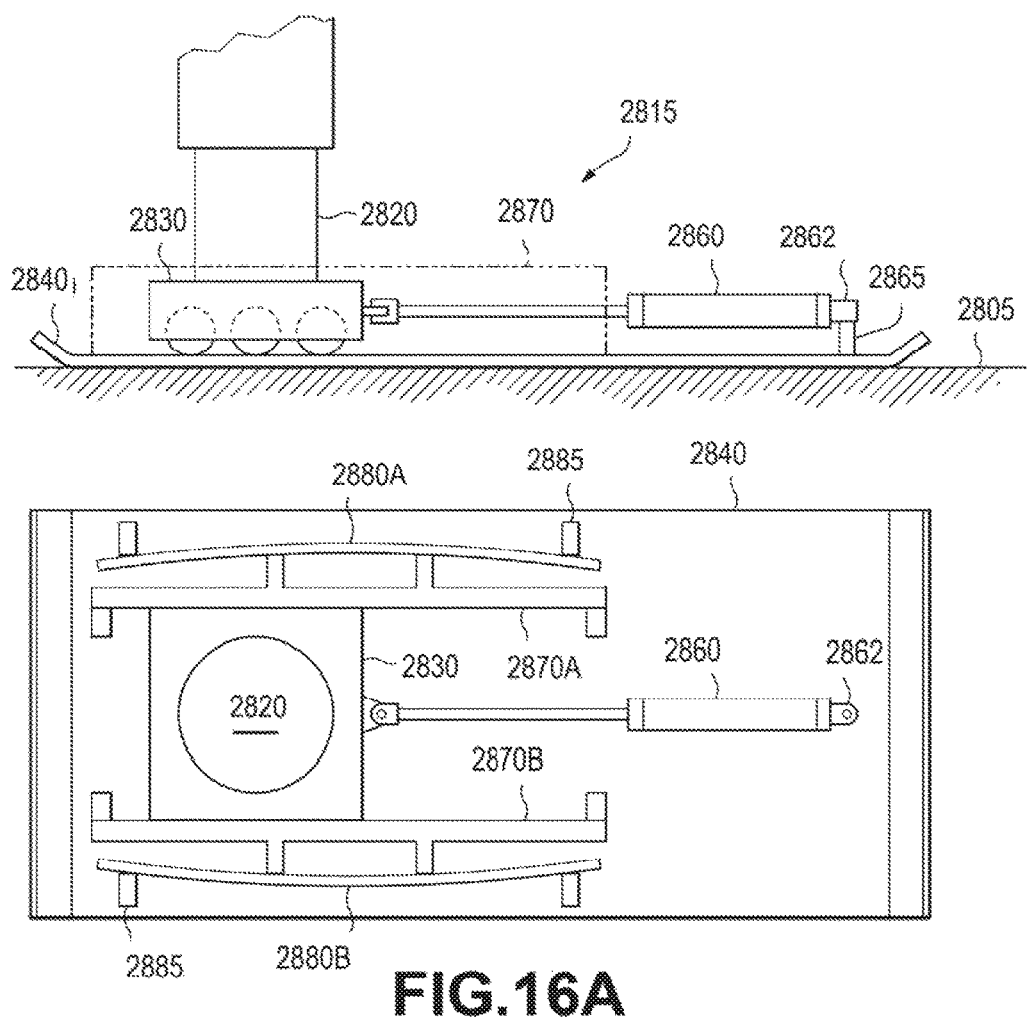
FIGS. 16A, 16B, 16C, and 16D are diagrams illustrating an example operation progression of the walking apparatus shown in FIG. 15 according to embodiments of the invention.

Referring to FIG. 16A, a walking apparatus 2815 includes a lift cylinder 2820, roller assembly 2830, travel mechanism 2860, and support foot 2840 as described above with reference to FIG. 15. Briefly, the travel mechanism, which is fixed to the support foot 2840 with a pin connection 2862 and pivot rod 2865, is configured to displace the roller assembly 2830 relative to the support foot 2840 during the load-movement phase of a walking cycle when the walking apparatus is engaged with a ground surface 2805 and a load is lifted above the ground surface by the lift mechanism 2820.

As discussed above with respect to FIG. 15, the walking apparatus 2815 also includes guide devices 2870A, 2870B positioned on either side of the roller assembly 2830, and biasing devices 2880A, 2880B, such as leaf springs, engaged with the respective guide devices. The leaf springs 2880A, 2880B are further fixed at end portions to spring stops 2885, which are attached to the support foot 2840. In FIG. 16A, the walking apparatus 2815 is shown at a point in the load-movement phase of a walking cycle prior to movement of the load.

Figure 16B:
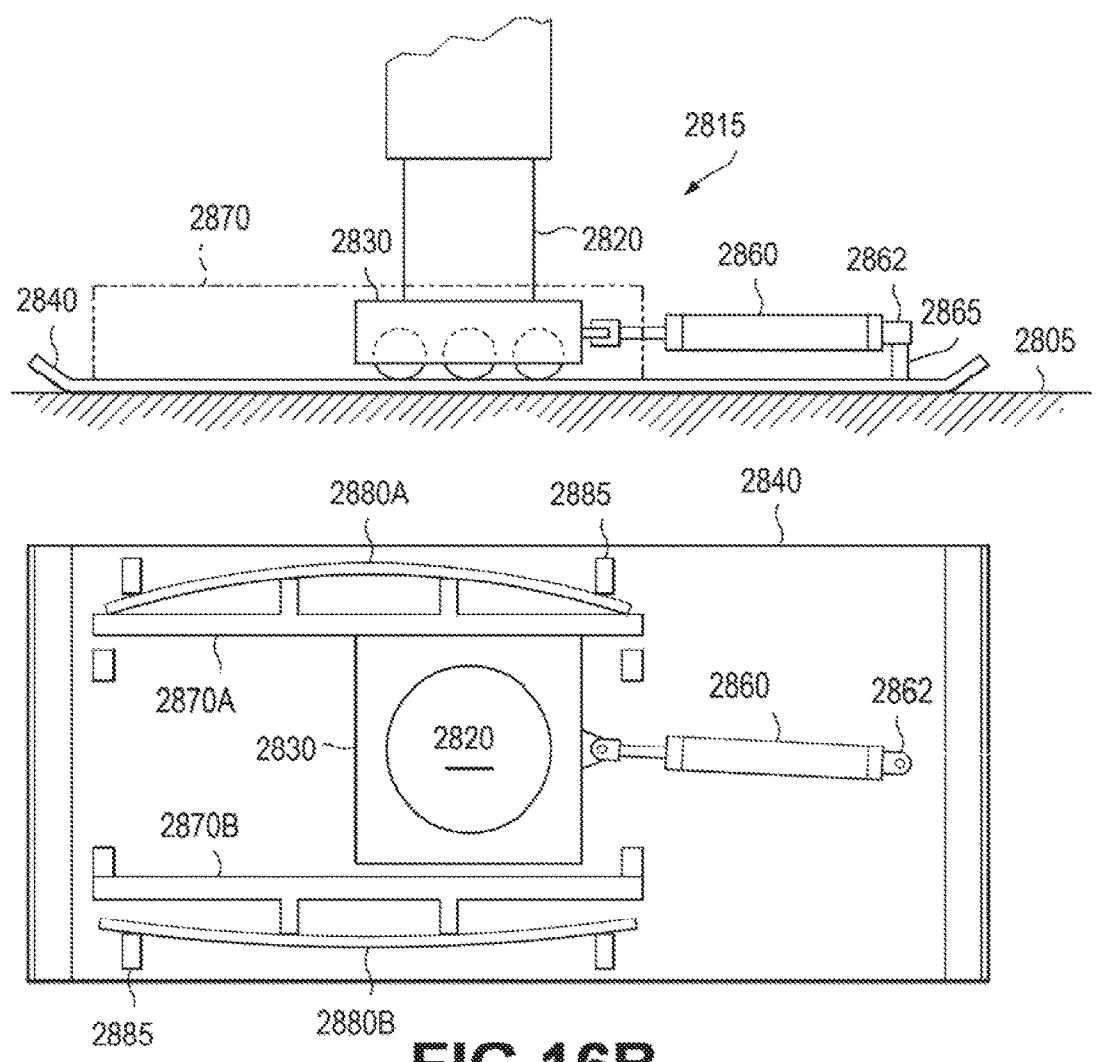

Referring to FIG. 16B, a spin movement or other non-linear movement is made by the walking apparatus 2815 as part of the load-movement phase of a walking cycle. Here, the travel mechanism 2860 is activated to pull the roller assembly 2830 toward the travel mechanism. In this instance, because the movement was non-linear, the roller assembly deviates from a set direction of travel (i.e., the orientation of the lengthwise direction of the support foot 2840) and presses against the upper guide device 2870A. By pressing against the upper guide device 2870A, the roller assembly 2830 shifts the guide device upward into the upper biasing leaf spring 2880A. This upward shift of the guide device 2870A deflects the upper leaf spring 2880A. Note that the roller assembly may become separated from the other guide device 2870B (lower guide device in this example) when shifting one of the guide devices 2870A. Note also, that the non-linear movement of the roller assembly 2830 may not be caused solely based on the pulling force of the travel mechanism 2860, but rather may be due to the movement of multiple walking apparatuses that are oriented in different directions to accomplish a spin movement, or other steering movement, as shown, for example, in FIG. 10D of the co-pending application Ser. No. 13/711,193 entitled ROTATION DEVICE FOR LOAD TRANSPORTING APPARATUS.

Figure 16C:
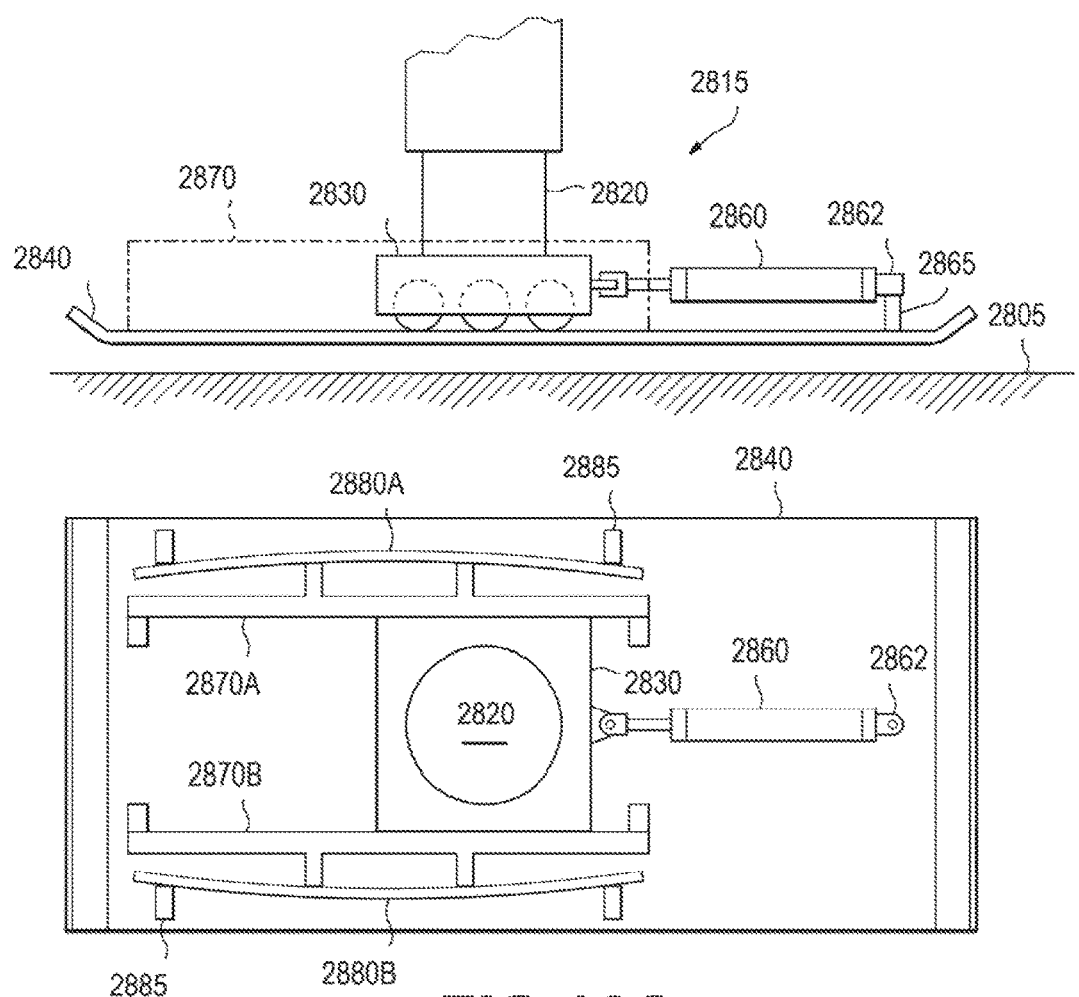

Referring to FIG. 16C, the lift mechanism 2820 is activated to lower the load to the ground surface 2805 and lift the walking apparatus 2815 above the ground surface. As the support foot 2840 loses contact with the ground surface 2805, the upper deflected leaf spring 2880A releases its stored potential energy by shifting the upper guide device 2870A back down toward the roller assembly 2830. The shifting upper guide device 2870A in turn pushes the roller assembly back to a centered position along a set direction of travel or longitudinal centerline of the support foot as shown in FIG. 16C. If this returning centering force from the deflected leaf spring 2880A is more than needed to return the roller assembly 2830 to a centered position, the lower guide device 2870B and lower biasing device 2880B help prevent the roller assembly 2830 from being pushed back past the centered position. This process shown in FIG. 16C may be part of the recovery phase of a walking cycle.

Figure 16D:
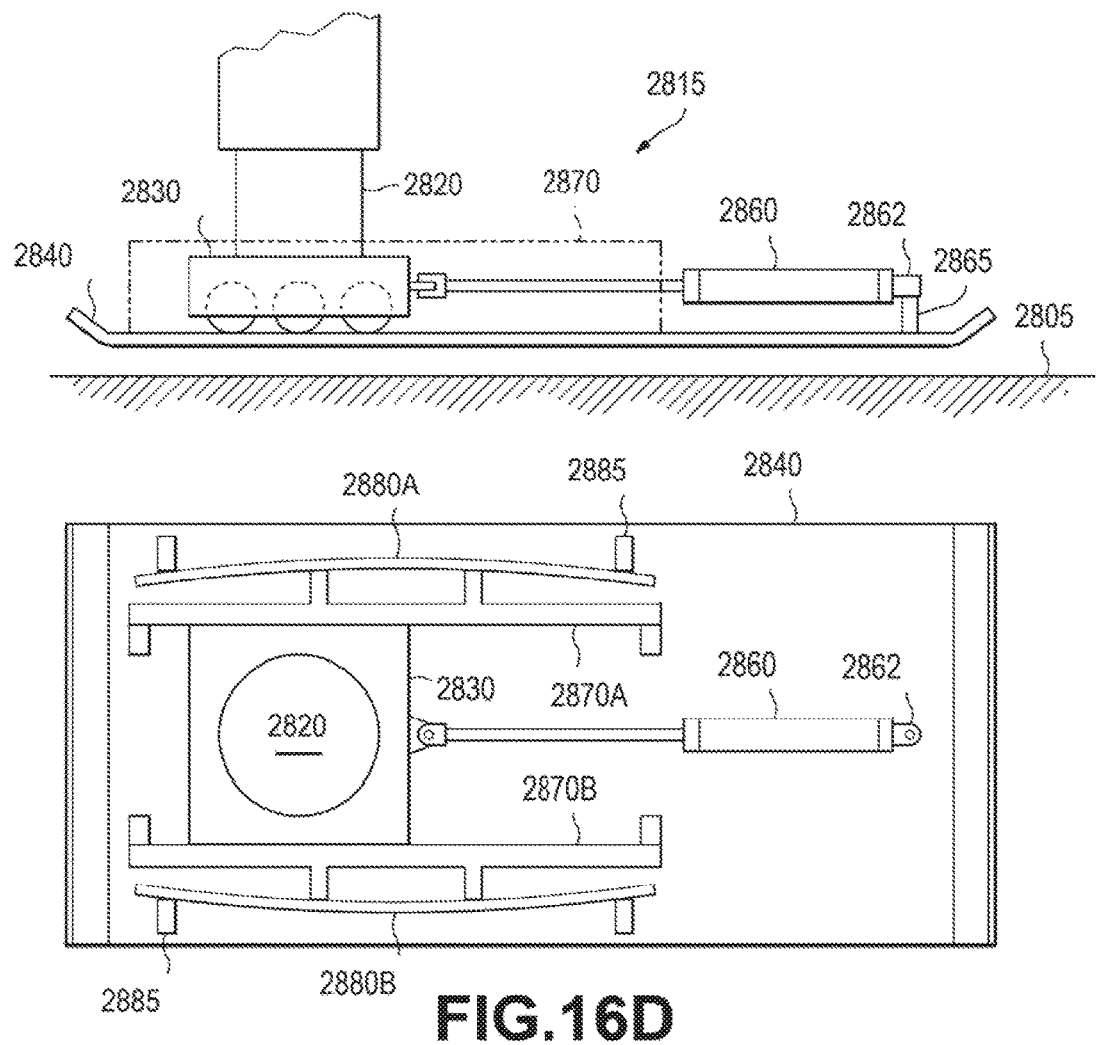

Referring to FIG. 16D, the travel cylinder 2860 is activated again to move the support foot 2840 forward in the direction of travel (here to the right). This movement repositions the support foot in anticipation of another walking cycle. From here, the lift mechanism would be activated to lower the support foot 2840 to the ground surface 2805 and raise the load, as shown in FIG. 16A.

FIG. 17 is a perspective view of another example walking apparatus according to embodiments of the invention. The embodiment of FIG. 17 is similar to the embodiment shown in FIG. 15 above except that instead of using a leaf spring 2780 as a biasing device, the embodiment in FIG. 17 uses individual coil springs 2980.

Referring to FIG. 17, a load transporting or walking apparatus 2915 includes a lift mechanism 2920, a roller assembly 2930, and a support foot 2940. The lift mechanism 2920 may include a hydraulic jack suspended from a horizontal beam of the load-bearing frame 310 (FIGS. 3A and 3B).

The lift mechanism 2920 may include a lift cylinder 2920 that is connected to a load-bearing frame 2910, and a cylinder rod 2922 coupled to the roller assembly 2930. Here, the cylinder rod 2922 may be structured to allow the roller assembly 2930 to rotate about a substantially vertical axis in the center of the cylinder rod. That is, the roller assembly 2930 may be free to rotate around the cylinder rod 2922. The connection between the roller assembly 2930 and the cylinder rod may be a bearing or one of a number of different connection variations. In one embodiment, the cylinder rod 2922 may include a groove (not shown) around side edges of a lower portion of the cylinder rod, where the groove corresponds to a retainer cuff (not shown) of the roller assembly 2930. In this example the retainer cuff is rotatable around the groove, but may easily be assembled or disassembled during installation, break-down, or transportation of the walking apparatus 2915.

Although the embodiment shown in FIG. 17 shows the lift cylinder 2921 connected to the load bearing frame 2910 and the cylinder rod 2922 connected to the roller apparatus 2930, in other embodiments, the cylinder rod may be connected to the load-bearing frame, and the lift cylinder may be connected to the roller apparatus. In these other embodiments, the cylinder may be structured to allow the roller assembly to rotate about a substantially vertical axis.

The walking apparatus 2915 may also include a travel mechanism 2960 that is connected to the support foot 2940 and coupled to the roller assembly 2930 such that when the travel mechanism is activated, the roller assembly moves relative to the support foot. In some embodiments, the travel mechanism 2960 is attached to the support foot with a pin connection 2962 and pivot rod 2965 to allow the travel mechanism 2960 to rotate relative to the support foot. The travel mechanism 2960 may also be coupled to the roller assembly 2930 with a pin connection to allow the roller assembly to pivot relative to the travel mechanism.

Although the travel mechanism 2960 is shown as a single cylinder in FIG. 17, the travel mechanism may include two or more travel cylinders in other embodiments. In other embodiments, the travel mechanism 2960 may include different movement structures, such as pulleys, levers, winches, tracks, etc.

In the embodiments shown in FIG. 17, the roller assembly 2930 may include a plurality of rollers or roller chain that rotate as well as roll on the roller track 2950. That is, in some embodiments, the roller assembly 2930 may include a WBOT series roller assembly from Hilman Rollers. Due to the configuration of the roller chain of the roller assembly 2930 and the tolerance between the roller assembly and the support foot 2940 of the walking machine 2915, the rollers of the roller chain will typically be engaged with the support foot 2940 during operation and use of the walking machine.

The roller assembly 2930 may be secured to the lower end of the lift mechanism 2920, with the roller assembly being captured within a U-shaped track created in part by the guide devices 2970. The roller assembly 2930 may be configured to roll along the bottom inside surface of the support foot 2940 as well as along the underside of two upper flanges (not shown for clarity purposes) that hold the roller assembly and support foot 2940 when the walking apparatus 2915 is raised above the ground surface 2905 by the lift mechanism 2920 during the recovery phase of a walking cycle. As will be understood from the more detailed discussion below, the travel mechanism 2960 permits for the translation of the support foot 2940 relative to the lift mechanism 2920 and vice versa.

As shown in FIG. 17, guide devices 2970 are positioned on either side of the roller apparatus and extend along a travel path of the roller assembly in a direction substantially parallel to the direction of travel. The guide devices 2970 may include stops on either end to help restrict the movement of the roller assembly 2930. In this illustrated embodiment, the biasing devices 2980 are coil springs that are attached to spring stops 2985. These coil springs 2980 may be positioned near end portions of the guide devices 2970 to provide stable deflection during the shifting of the guide devices. The spring stops 2985 are further fixed to the support foot 2940 to provide fixed points of reference for the coil springs 2980. In operation, which is discussed in additional detail below with reference to FIGS. 18A-18D, the coil springs 980 are deflected by compressing toward the spring stops 985 when the roller assembly 930 pushes against and shifts the guide devices 970. The coil springs 980 may include steel, plastic, or any other type of material that can act as spring device.

FIGS. 18A, 18B, 18C, and 18D are diagrams illustrating an example operation progression of the walking apparatus shown in FIG. 17 according to embodiments of the invention.

Figure 18A:
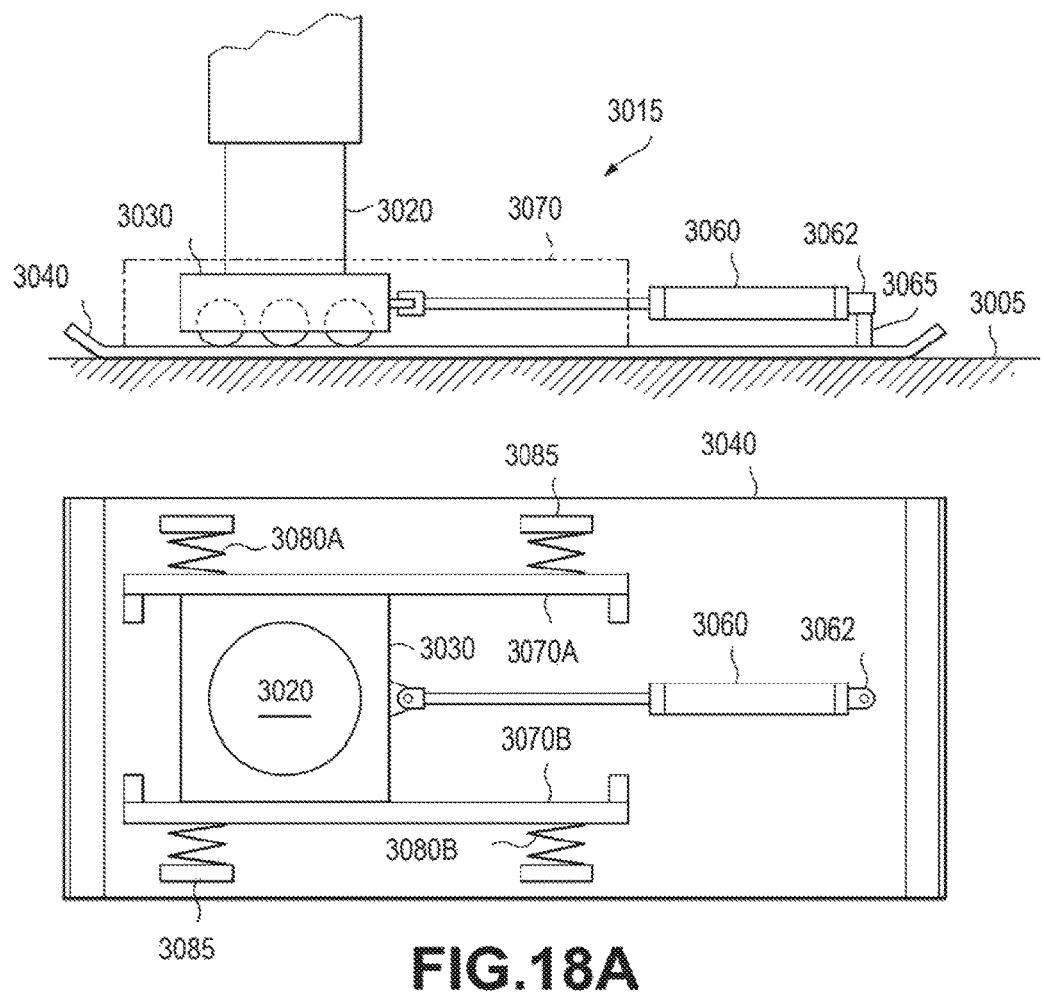
FIGS. 18A, 18B, 18C, and 18D are diagrams illustrating an example operation progression of the walking apparatus shown in FIG. 17 according to embodiments of the invention.

Referring to FIG. 18A, a walking apparatus 3015 includes a lift cylinder 3020, roller assembly 3030, travel mechanism 3060, and support foot 3040 similar to support foot 2940 as described above with reference to FIG. 17. Briefly, the travel mechanism, which is fixed to the support foot 3040 with a pin connection 3062 and pivot rod 3065, is configured to displace the roller assembly 3030 relative to the support foot 3040 during the load-movement phase of a walking cycle when the walking apparatus is engaged with a ground surface 3005 and a load is lifted above the ground surface by the lift mechanism 3020.

As discussed above with respect to FIG. 17, the walking apparatus 3015 also includes guide devices 3070A, 3070B positioned on either side of the roller assembly 3030, and biasing devices 3080A, 3080B, such as coil springs, engaged with the respective guide devices. The coil springs 3080A, 3080B are further fixed to spring stops 3085, which are attached to the support foot 3040. In FIG. 18A, the walking apparatus 3015 is shown at a point in the load-movement phase of a walking cycle prior to movement of the load.

Figure 18B:
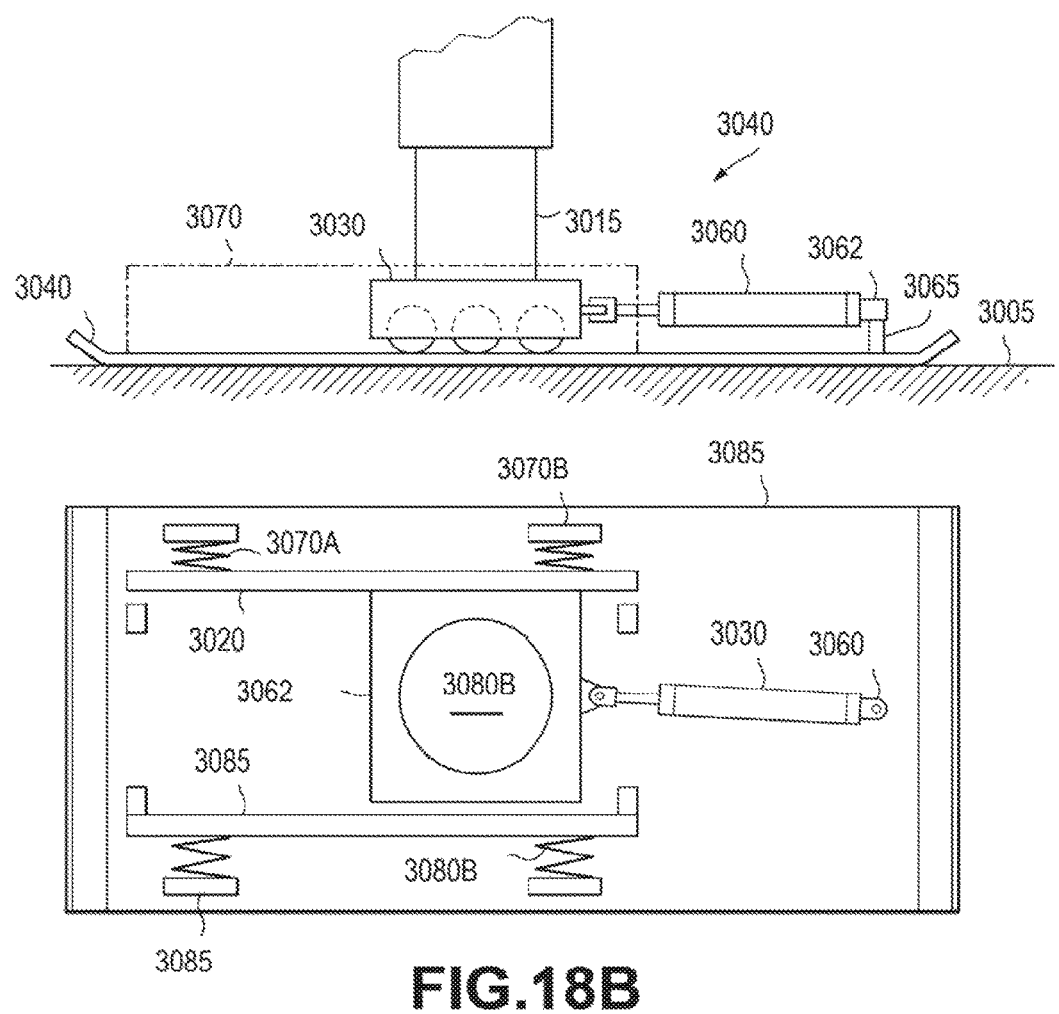

Referring to FIG. 18B, a spin movement or other non-linear movement is made by the walking apparatus 3015 as part of the load-movement phase of a walking cycle. Here, the travel mechanism 3060 is activated to pull the roller assembly 3030 toward the travel mechanism. In this instance, because the movement was non-linear, the roller assembly deviates from a set direction of travel (i.e., the orientation of the lengthwise direction of the support foot 3040) and presses against the upper guide device 3070A. By pressing against the upper guide device 3070A, the roller assembly 3030 shifts the guide device upward into the upper biasing coil springs 3080A. This upward shift of the guide device 3070A compresses the upper coil springs 3080A. Note that the roller assembly 3030 may become separated from the other guide device 3070B (lower guide device in this example) when shifting one of the guide devices 3070A. Note also, that the non-linear movement of the roller assembly 3030 may not be caused solely based on the pulling force of the travel mechanism 3060, but rather may be due to the movement of multiple walking apparatuses 3015 that are oriented in different directions to accomplish a spin movement, or other steering movement, as shown, for example, in FIG. 18 of the co-pending application Ser. No. 13/711,193 entitled ROTATION DEVICE FOR LOAD TRANSPORTING APPARATUS.

Figure 18C:
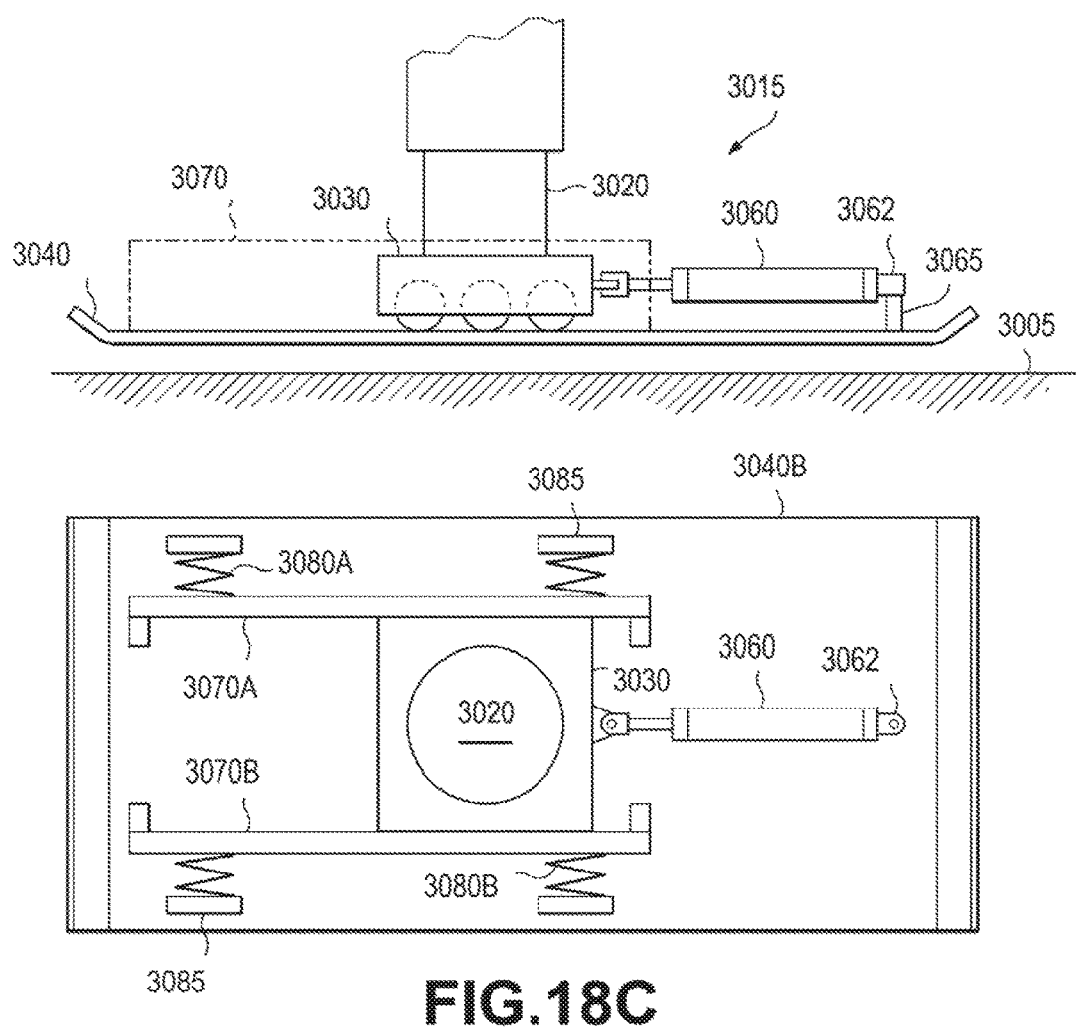

Referring to FIG. 18C, the lift mechanism 3020 is activated to lower the load to the ground surface 3005 and lift the walking apparatus 3015 above the ground surface. As the support foot 3040 loses contact with the ground surface 3005, the upper deflected coil springs 3080A release their stored potential energy by shifting the upper guide device 3070A back down toward the roller assembly 3030. The shifting upper guide device 3070A in turn pushes the roller assembly back to a centered position along a set direction of travel or longitudinal centerline of the support foot as shown in FIG. 18C. If this returning centering force from the deflected coil springs 3080A is more than needed to return the roller assembly 3030 to a centered position, the lower guide device 3070B and lower biasing device 3080B help prevent the roller assembly 3030 from being pushed back past the centered position.

Figure 18D:
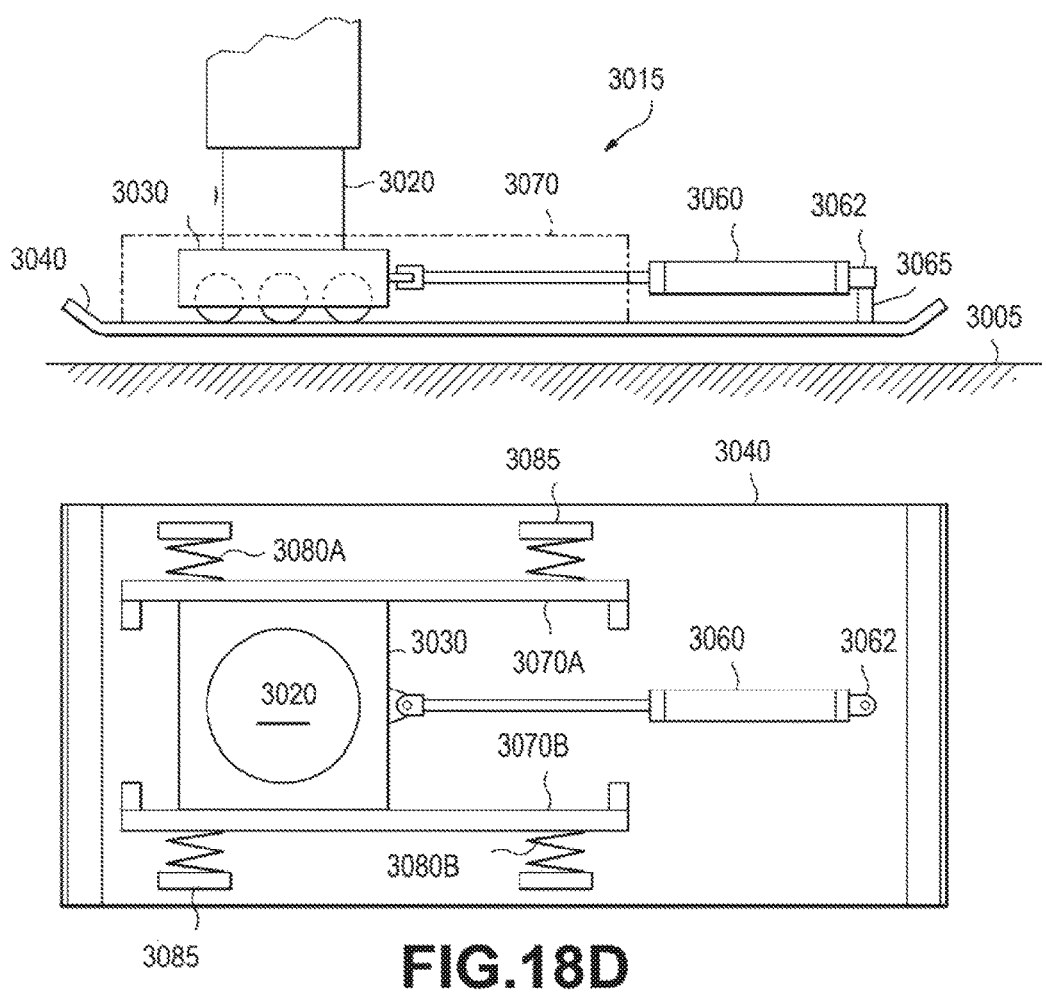

Referring to FIG. 18D, the travel cylinder 3060 is activated again to move the support foot 3040 forward in the direction of travel (here to the right). This movement repositions the support foot in anticipation of another walking cycle. From here, the lift mechanism would be activated to lower the support foot 3040 to the ground surface 3005 and raise the load, as shown in FIG. 18A.

Figure 19A:
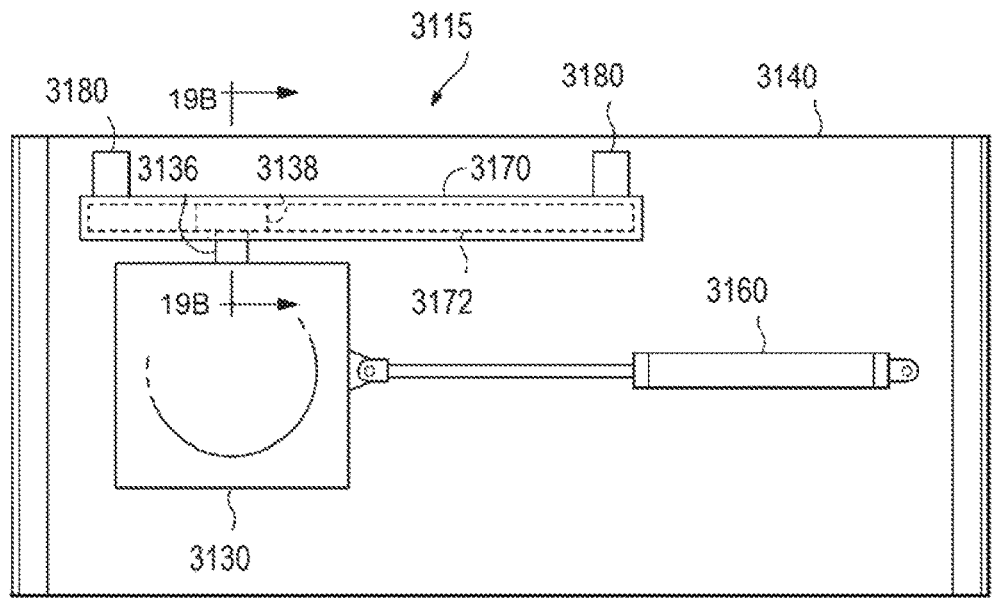
FIG. 19A is a top view of another example walking apparatus according to embodiments of the invention.
Figure 19B:
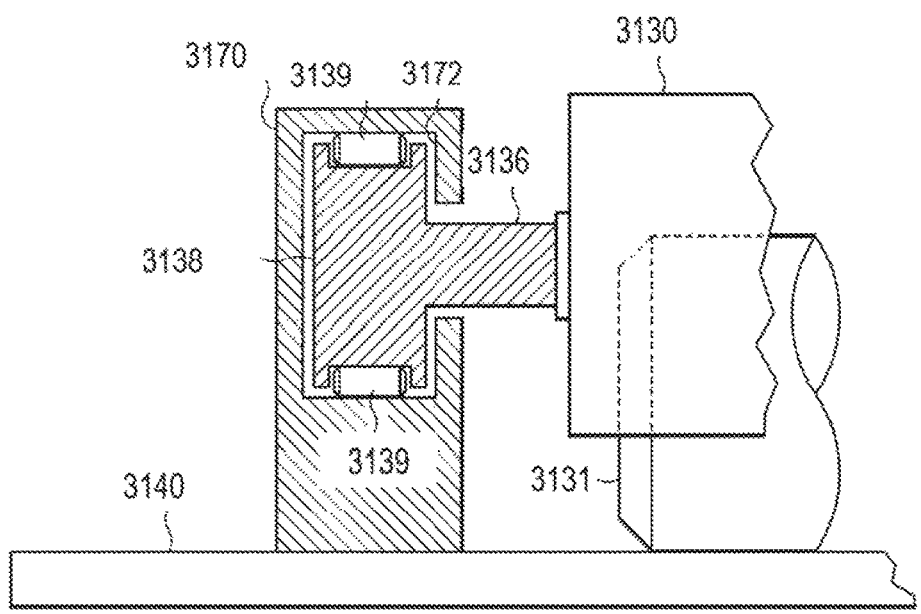
FIG. 19B is a cross-sectional detail diagram taken along line 19B of the walking apparatus shown in FIG. 19A.

FIG. 19A is a top view of another example walking apparatus according to embodiments of the invention. FIG. 19B is a cross-sectional detail diagram taken along line 19B of the walking apparatus shown in FIG. 19A. Referring to FIGS. 19A and 19B, a walking apparatus 3115 includes a roller assembly 3130 positioned on a support foot 3140. The roller assembly 3130 may include one or more rollers 3131 that allow the roller assembly to be moved by a travel mechanism 3160 connected to the roller assembly. The travel mechanism 3160 can be activated to move the roller assembly 3130 in a desired direction of travel relative to the support foot 3140 as described above. The walking apparatus 3115 also includes a guide device 3170 and one or more biasing devices 3180. The biasing devices 3180 may be fixed to the support foot 3140 (or roller track, as described above) and coupled to the guide device 3170. This configuration allows the guide device 3170 to be shifted relative to the support foot 3140 during non-linear movements, such as spin movements of the walking apparatus 3115.

Unlike some of the embodiments discussed above, the embodiment of the walking apparatus 3115 shown in FIGS. 19A and 19B include only a single guide bar 3170 positioned on one side of the roller assembly. To center the support foot 3140 during a recovery phase of a walking cycle when the roller assembly 3130 is displaced on either side of a longitudinal centerline of the support foot 3140 (i.e., deviates from a set direction of travel), the guide bar 3170 includes a slot 3172 that partially encloses a retaining portion 3138 of a guide spacer 3136. The guide spacer 3136 may be fixed to the roller assembly 3130 and move within the slot 3172 of the guide bar 3170 via guide rollers 3139. By partially enclosing the retaining portion 3138 of the guide spacer 3136, the guide device 3170 will compress the biasing devices 3180 if the roller assembly deviates from the direction of travel toward the guide device, and the guide device will expand the biasing devices if the roller assembly deviates from the direction of travel away from the guide device. Hence, this embodiment requires only a single guide bar 3170 rather than multiple guide bars around the roller assembly.

Figure 20A:
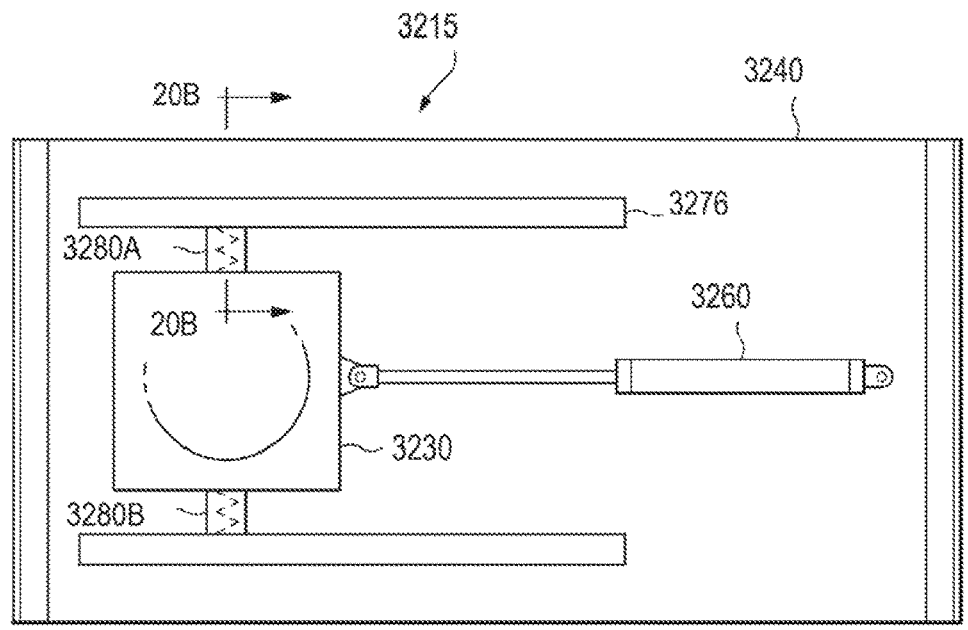
FIG. 20A is a top view of another example walking apparatus according to embodiments of the invention.
Figure 20B:
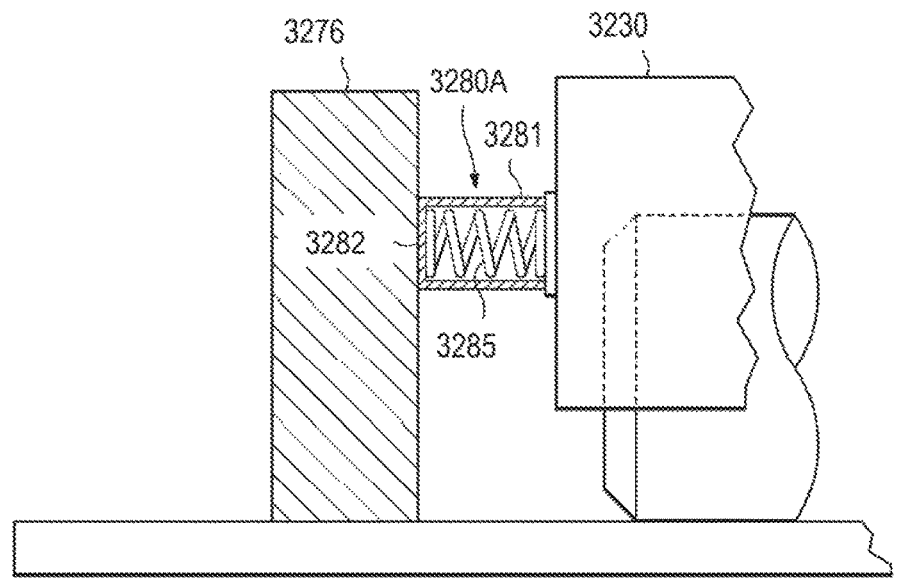
FIG. 20B is a cross-sectional detail diagram taken along line 20B of the walking apparatus shown in FIG. 20A.

FIG. 20A is a top view of another example walking apparatus according to embodiments of the invention. FIG. 20B is a cross-sectional detail diagram taken along line 20B of the walking apparatus shown in FIG. 20A. Referring to FIGS. 20A and 20B, a walking apparatus 3215 includes a roller assembly 3230 positioned on a support foot 3240. The roller assembly 3230 may include one or more rollers that allow the roller assembly to be moved by a travel mechanism 3260 connected to the roller assembly. The travel mechanism 3260 can be activated to move the roller assembly 3230 in a desired direction of travel relative to the support foot 3240 as described above. The walking apparatus 3215 also includes a guide device 3276 and one or more biasing devices 3280A, 3280B. In this embodiment, the guide bars 3276 of the guide device are fixed to the support foot 3240 and do not substantially move when the roller assembly is moved in a linear or non-linear manner relative to the set direction of travel. Rather, the biasing devices 3280A, 3280B are positioned between the fixed guide bars 3276 and the roller assembly 3230. This configuration allows the biasing devices 3280A, 3280B to be directly deflected by the movement of the roller assembly. Here, a first biasing device 3280A may be positioned and fixed on one side of the roller assembly 3230, and a second biasing device 3280B may be positioned and fixed on an opposite side of the roller assembly 3230.

In some embodiments, the biasing devices may each include a housing 3281, a pre-compressed spring 3285, and a rub surface 3282. The pre-compressed spring 3285 may be compressed a desired amount in the housing 3281. This pre-compression allows the biasing devices 3280A, 3280B to be deflected or compressed further when a deviation of travel from the roller assembly 3230 is directed toward the biasing device, while allowing the other biasing device on the other side of the roller assembly to disengage from the guide bar 3276. This allows a faster and easier return to a centered position because the biasing devices are not acting against each other. The housing 3281 may be structured to be flexible to allow further compression of the spring 3285, but have a maximum fixed extendable length to prevent the spring from extending beyond a desired pre-compressed state. The rub surface 3282 may be structured to move along the fixed guide bars 3276 without excessive friction. Hence, the rub surface may include a material with a relatively low coefficient of friction. Additionally, the rub surface may be replaceable in case it is excessively worn or otherwise damaged.

FIG. 21 is a flow diagram illustrating method of operating a load transporting apparatus according to embodiments of the invention. In particular, the flow diagram of FIG. 21 illustrates a method of centering a lift mechanism of a load transporting device relative to a support foot during a load-transporting movement. The load transporting device includes a roller assembly coupled to the lift mechanism, a travel mechanism structured to displace the roller assembly relative to the support foot, and one or more guide devices coupled to the support foot by a biasing device and positioned adjacent to the roller assembly.

Referring to FIG. 21, a flow begins at process 3305 where the lift mechanism is activated to lower the support foot to a ground surface and raising a load supported by the load-bearing frame. In process 3310, the travel mechanism is activated to displace the roller assembly connected to the lift mechanism relative to the support foot and ground surface, thereby moving a position of the load in a predefined direction of travel. Depending on the movement of the travel mechanism relative to the centerline of the support foot (or in embodiments with a roller track, relative to the centerline of the roller track, or set direction of travel), the position of the lift cylinder may deviate from the longitudinal centerline of the support foot or roller track (i.e., deviate from a set direction of travel). As discussed above, when the roller assembly and load are moved off of a set direction of travel, the guide devices are shifted by the load displacement thereby deflecting the biasing devices. On the other hand, if the roller assembly moves along the set direction of travel (i.e., stays centered on a longitudinal centerline of the support foot or roller track), the guide devices are not shifted and the biasing devices are not further activated. In process 3315, it is observed whether the resulting position of the roller assembly has deviated from a set direction of travel or centerline of the support foot or roller track.

When the roller assembly has followed the set direction of travel, the flow proceeds to process 3320 where the lift mechanism is activated to lower the load and raise the support foot. However, when the roller assembly has deviated from a set direction of travel, the guide device is shifted by the movement of the roller assembly and load thereby deflecting the biasing device as shown in step 3325. That is, the biasing devices are deflected when movement of the roller assembly results in deviation from a set direction of travel. In process 3330, the lift mechanism is activated to lower the load and raise the support foot from the ground surface. As the support foot loses contact with the ground surface, the deflected biasing device acts on the support foot or roller track to center the support foot relative to the roller assembly, as shown in step 3335. That is, support foot and roller track, if present, are automatically centered with respect to the lift mechanism or lift cylinder. After step 3335 or process 3320, the flow may include optional process 3340 where the lift mechanism is repositioned with respect to the support foot. If further walking steps are needed to move the load to a final position, the flow may return to process 3305 to initiate another walking cycle.

As described above, some embodiments of this invention are directed to a load transporting apparatus configured to move a load over a ground surface in one or more incremental steps each including a load-movement phase and a recovery phase. The load transporting apparatus may include a load bearing frame attached to the load, and a lift mechanism having a lift cylinder connected to the load bearing frame and a cylinder rod. The lift mechanism may be structured, for example, to lift the load-bearing frame at the start of the load-movement phase. A roller assembly may be coupled to the cylinder rod of the lift mechanism, where the roller assembly includes a roller frame and one or more rollers set in the roller frame. The load transporting apparatus also includes a support foot coupled to the roller frame of the roller assembly and structured to interface with the ground surface. The support foot has a length, width, and longitudinal centerline bisecting the width of the support foot. A travel mechanism may be coupled to the roller assembly, where the travel mechanism is structured to move the roller assembly relative to the support foot during, for example, the load-movement phase of a walking cycle. Guide bars positioned on opposite sides of the roller frame are displaced adjacent to the roller frame. The guide bars may be positioned substantially parallel with the length of the support foot. Additionally, one or more biasing devices may be coupled between the guide bars and the support foot. The biasing devices may be structured to become deflected during a load-movement phase where the roller assembly is non-linearly displaced by the travel mechanism relative to the longitudinal center line of the support foot, and structured to return the support foot to a centered position relative to the roller assembly about the longitudinal center line of the support foot during a recovery phase.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

The invention claimed is:

1. A load transporting apparatus configured to move a load over a base surface in one or more incremental steps each including a load-movement phase and a recovery phase, the load transporting apparatus comprising:
   a support foot configured to interface with the base surface;
   a lift mechanism coupled between the support foot and a load bearing frame supporting the load, the lift mechanism configured to lower the support foot onto the surface and raise the load bearing frame off of the surface during a load-movement phase and raise the support foot off of the surface and lower the load bearing frame onto the surface during a recovery phase;
   a roller assembly coupled to the lift mechanism;
   a travel mechanism coupled to the roller assembly, the travel mechanism configured to angularly displace the roller assembly relative to the load bearing frame during the load-movement phase; and
   an alignment restoration device configured to move the support foot back to a substantially parallel alignment with the load-bearing frame during the recovery phase.

2. The apparatus of claim 1, wherein the alignment restoration device moves the support foot back to the substantially parallel alignment during the recovery phase.

3. The apparatus of claim 1, wherein the alignment restoration device comprises at least one of an elongated bar or a leaf spring.

4. The apparatus of claim 1, wherein the alignment restoration device comprises a coil spring.

5. The apparatus of claim 1, wherein the alignment restoration device comprises a chain.

6. The apparatus of claim 1, wherein the alignment restoration device comprises a hydraulic cylinder.

7. The apparatus of claim 1, wherein the alignment restoration device comprises a motor.

8. The apparatus of claim 1, wherein the alignment restoration device is operably coupled to the roller assembly.

9. The apparatus of claim 1, wherein the alignment restoration device is coupled between the load bearing frame and the support foot.

10. An apparatus to move a load over a surface, comprising:
    a support foot configured to contact the surface;
    a lift mechanism coupled between the support foot and a load bearing frame configured to lower the support foot onto the surface and raise the load bearing frame off of the surface during a load-movement phase and raise the support foot off of the surface and lower the load bearing frame onto the surface during a recovery phase;
    a travel mechanism coupled to the support foot and the lift mechanism, the travel mechanism configured to move the load bearing frame in non-parallel directions relative to a longitudinal axis of the support foot during the load-movement phase; and
    a biasing device configured to activate based on a change in a positional relationship between the load bearing frame and the support foot and return the longitudinal axis of the support foot back to a substantially parallel alignment with a longitudinal axis of the load bearing frame during the recovery phase.

11. The apparatus of claim 10, wherein the biasing device is configured to:
    elastically deform when the load bearing frame is moved in the non-parallel directions; and
    return to an un-deformed state during the recovery phase.

12. The apparatus of claim 10, wherein the biasing device comprises an elongated bar operably coupled to front and back ends of the support foot.

13. The apparatus of claim 10, wherein the biasing device comprises at least one of a hydraulic cylinder and motor.

14. The apparatus of claim 10, wherein the biasing device is operably coupled between the load bearing frame and the support foot.

15. The apparatus of claim 10, including a roller assembly coupled to the lift mechanism and the travel mechanism, wherein the travel mechanism is configured to displace the roller assembly and displace the load bearing frame in the non-parallel directions relative to the support foot.

16. The apparatus of claim 10, wherein the biasing device is operably coupled to the roller assembly.

17. An apparatus configured to move a load over a surface, comprising:
    a support foot having a longitudinal axis in substantially parallel alignment with a longitudinal axis of a load bearing frame supporting the load;
    a lift mechanism configured to lift the load bearing frame supporting the load;
    a travel mechanism operably coupled to the support foot and the lift mechanism, the travel mechanism configured to move the load bearing frame in a direction different from a direction of the longitudinal axis of the support foot;
    a biasing device operably coupled to the support foot and configured to move the longitudinal axis of the support foot back into substantially parallel alignment with the longitudinal axis of the load bearing frame; and
    wherein when the support foot is lowered to the surface, the load bearing frame is raised above the surface, and the travel mechanism moves the load bearing frame in the direction different from the direction of the longitudinal axis of the support foot, and wherein the biasing device is configured to move the longitudinal axis of the support foot back into substantially parallel alignment with the longitudinal axis of the load bearing frame after the lift mechanism raises the support foot off of the surface.

18. The apparatus of claim 17, wherein the biasing device is configured to deform when the support foot is lowered to the surface, the load bearing frame is raised above the surface, and the travel mechanism moves the load bearing frame in the direction different from the direction of the longitudinal axis of the support foot.

19. The apparatus of claim 17, wherein the biasing device comprises an elongated bar.

20. The apparatus of claim 17, wherein the biasing device comprises at least one of a hydraulic cylinder and a motor.

* * * * *